United States Patent
Harrison

(10) Patent No.: US 11,785,476 B2
(45) Date of Patent: Oct. 10, 2023

(54) SENSOR FUSION SCANNING SYSTEM AND METHOD FOR WIRELESS NETWORK PLANNING

(71) Applicant: Metawave Corporation, Carlsbad, CA (US)

(72) Inventor: Matthew Paul Harrison, Palo Alto, CA (US)

(73) Assignee: Metawave Corporation, Carlsbad, CA (US)

( * ) Notice: Subject to any disclaimer, the term of this patent is extended or adjusted under 35 U.S.C. 154(b) by 0 days.

(21) Appl. No.: 17/102,270

(22) Filed: Nov. 23, 2020

(65) Prior Publication Data

US 2021/0160702 A1    May 27, 2021

Related U.S. Application Data

(60) Provisional application No. 62/938,459, filed on Nov. 21, 2019.

(51) Int. Cl.
*H04W 16/20* (2009.01)
*H04B 17/391* (2015.01)
*H04W 16/22* (2009.01)

(52) U.S. Cl.
CPC ........ *H04W 16/20* (2013.01); *H04B 17/3913* (2015.01); *H04W 16/225* (2013.01)

(58) Field of Classification Search
CPC .............. G01S 13/867; G01S 13/86; G01S 2013/93272; G01S 7/415; G01S 13/88; G01S 7/412; G01S 13/726; G01S 13/865; G01S 2013/93271; G01S 17/89; G01S 13/66; G01S 19/42; G01S 7/4004; G01S 7/41; G01S 17/931; G01S 2013/0245; G01S 2013/9316; G01S 15/8997; G01S 17/86;

(Continued)

(56) References Cited

U.S. PATENT DOCUMENTS 9,648,547 B1    5/2017 Hart et al.
2018/0254547 A1*    9/2018 Cwik .................... H01Q 3/06

(Continued)

OTHER PUBLICATIONS

T.E. Bogale et al., "Machine Intelligence Techniques for Next-Generation Context-Aware Wireless Networks," ITU Journal: ICT Discoveries, Special Issue No. 1, pp. 1-11, Feb. 2018.

*Primary Examiner* — Fred A Casca

(57) ABSTRACT

Examples disclosed herein relate to a sensor fusion scanning system for wireless network planning. The system includes a sensor scanning mobile platform comprising a beam steering radar sensor and one or more auxiliary sensors, the sensor scanning mobile platform configured to scan a wireless environment, a reflectivity engine configured to generate a reflectivity representation of the wireless environment based on radar data from the beam steering radar sensor, a sensor fusion processing engine configured to generate a Three-Dimensional ("3D") representation of the wireless environment based on the radar data and sensor data from the one or more auxiliary sensors, and a reflectarray planning engine configured to design a plurality of reflectarrays and determine locations for the plurality of reflectarrays in the wireless environment based on the reflectivity representation and the 3D representation.

20 Claims, 20 Drawing Sheets

(58) Field of Classification Search
CPC .. G01S 17/90; G01S 2013/9315; G01S 13/89; H04W 4/80; H04W 16/28; H04W 16/20; H04W 16/225; H04W 4/02; H04W 4/027; H04W 4/40; H04W 4/46; H04W 16/18; H04B 17/3913; H04B 17/3912
See application file for complete search history.

(56) References Cited

U.S. PATENT DOCUMENTS

2018/0348343 A1* 12/2018 Achour .............. H01Q 15/0066
2020/0161759 A1* 5/2020 Bulja ................... H01Q 1/1271
2021/0055110 A1* 2/2021 Knutson .............. G01S 19/428

* cited by examiner

SENSOR FUSION SCANNING SYSTEM AND METHOD FOR WIRELESS NETWORK PLANNING

CROSS-REFERENCE TO RELATED APPLICATIONS

This application claims the benefit of U.S. Provisional Application No. 62/938,459 filed on Nov. 21, 2019, which is incorporated by reference in its entirety for all purposes.

BACKGROUND

New generation wireless networks are increasingly becoming a necessity to accommodate user demands. Mobile data traffic continues to grow every year, challenging the wireless networks to provide greater speed, connect more devices, have lower latency, and transmit more and more data at once. Users now expect instant wireless connectivity regardless of the environment and circumstances, whether it is in an office building, a public space, an open preserve, or a vehicle. In response to these demands, new wireless standards have been designed for deployment in the near future. A large development in wireless technology is the fifth generation of cellular communications ("5G") which encompasses more than the current Long-Term Evolution ("LTE") capabilities of the Fourth Generation ("4G") and promises to deliver high-speed Internet via mobile, fixed wireless and so forth. The 5G standards extend operations to millimeter wave bands, which cover frequencies beyond 6 GHz, and to planned 24 GHz, 26 GHz, 28 GHz, and 39 GHz up to 300 GHz, all over the world, and enable the wide bandwidths needed for high speed data communications.

The millimeter wave ("mm-wave") spectrum provides narrow wavelengths in the range of ~1 to 10 millimeters that are susceptible to high atmospheric attenuation and have to operate at short ranges (just over a kilometer). In dense-scattering areas with street canyons and in shopping malls for example, blind spots may exist due to multipath, shadowing and geographical obstructions. In remote areas where the ranges are larger and sometimes extreme climatic conditions with heavy precipitation occur, environmental conditions may prevent operators from using large array antennas due to strong winds and storms. These and other challenges in providing millimeter wave wireless communications for 5G networks impose ambitious goals on system design, including the ability to generate desired beam forms at controlled directions while avoiding interference among the many signals and structures of the surrounding environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein FIG. 1 conceptually illustrates an example of reflectarray antennas in an outdoor wireless environment in accordance with various implementations of the subject technology.

DETAILED DESCRIPTION

A sensor fusion scanning system and method for wireless network planning are disclosed. The sensor fusion scanning system deploys camera, lidar (light detection and ranging) and radar sensors in a sensor scanning mobile platform to scan a wireless network environment and generate a three-dimensional ("3D") representation of the environment. The 3D representation is used for better planning of a millimeter wave wireless network (e.g., a 5G network) that is deployed with strategically placed reflectarrays designed to achieve higher gain and improve the network performance in both Line-of-Sight ("LOS") and Non-Line-of-Sight ("NLOS") areas in the environment. In various examples, the sensor fusion scanning system has a beam steering radar that combines analog beamforming and beam steering with advanced Digital Signal Processing ("DSP") techniques to generate directed, narrow beams that cover a full 360° Field-of-View ("FoV"). The beams are reflected back from surfaces and objects in the environment located at both short and long distances (>300 meters) from the radar to determine their reflectivity. A reflectivity representation of the environment is generated and combined with the 3D representation to plan the design and placement of the reflectarrays. The reflectarrays are suitable for many different 5G and other wireless applications and can be deployed in a variety of environments and configurations.

In various examples, the reflectarrays are arrays of cells having reflector elements that reflect incident radio frequency ("RF") signals from various directions into specific angles. The reflector elements may be metastructures, which, as generally defined herein, are engineered, non- or semi-periodic structures that are spatially distributed to meet a specific phase and frequency distribution. A metastructure reflector element is designed to be very small relative to the wavelength of the reflected RF signals. The reflectarrays are able to operate at the higher frequencies required for 5G and at relatively short distances. Their design and configuration are driven by geometrical and link budget considerations for a given application or deployment, whether indoors or outdoors.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
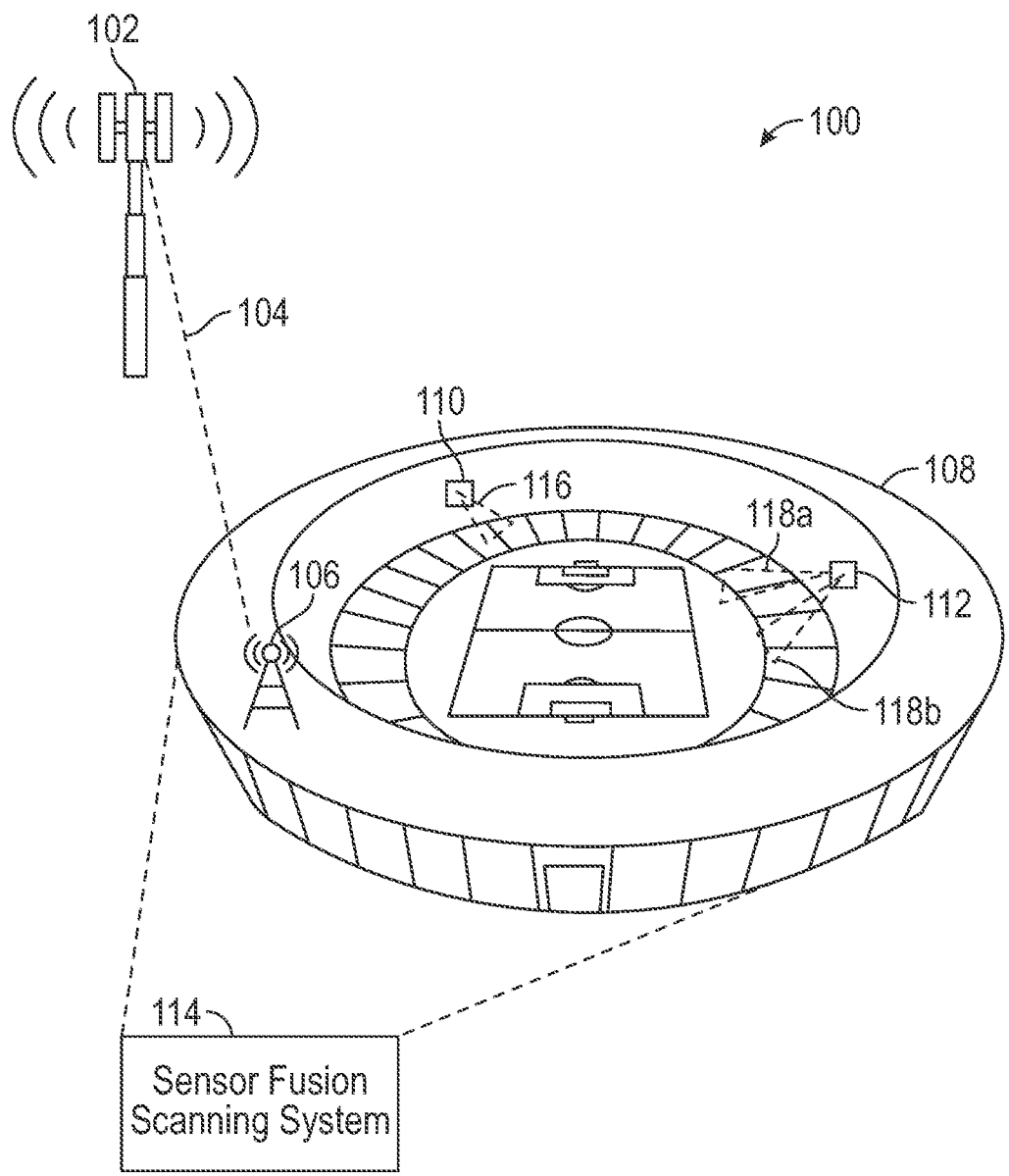

FIG. 1 conceptually illustrates an example of reflectarray antennas in an outdoor wireless environment 100 in accordance with various implementations of the subject technology. A wireless Base Station ("BS") 102 transmits to and receives wireless signals 104 from a wireless radio 106 that is installed on the roof of a stadium 108. The wireless radio 106 may transmit to and receive wireless signals from mobile devices or User Equipment ("UE") within its coverage area. The coverage area may be disrupted by buildings or other structures in the outdoor environment, which may affect the quality of the wireless signals. As depicted in FIG. 1, the stadium 108 and its structural features can affect the coverage area of the BS 102 and/or the wireless radio 106 such that it has a LOS zone. The UE that are outside of the LOS zone may have either no wireless access, significantly reduced coverage, or impaired coverage. Given the very high frequency bands (e.g., millimeter wave frequencies) utilized for 5G traffic, it may be difficult to expand the coverage area outside the LOS zone of the wireless radio 106.

Wireless coverage can be significantly improved to users outside of the LOS zone by the installation of reflectarray antennas on a surface of a structure (e.g., roof, wall, post, window, etc.). As depicted in FIG. 1, reflectarray antennas 110-112 are placed at distinct locations of the stadium 108. For example, each reflectarray antenna may be placed on a roofline edge. The design and placement of the reflectarray antennas 110-112 and any additional reflectarray placed in the stadium 108 are determined by the sensor fusion scanning system 114. The sensor fusion scanning system employs camera, lidar and radar sensors to determine a 3D representation of the stadium 108 and a reflectivity representation of the surfaces in the stadium 108. The 3D and reflectivity representations are used to determine which locations around the stadium 108 are optimal to increase the coverage area to the UEs and which reflectarray design achieves the desired wireless network performance.

Each of the reflectarray antennas 110-112 is a robust and low-cost passive relay antenna that is designed and positioned at a location determined by the sensor fusion scanning system 108 to significantly improve network coverage. As illustrated, each of the reflectarray antennas 110-112 is formed, placed, configured, embedded, or otherwise connected to a portion of the stadium 108. Although multiple reflectarrays are shown for illustration purposes, a single reflectarray may be placed in external and/or internal surfaces of the stadium 108 depending on implementation.

In some implementations, each of the reflectarray antennas 110-112 can serve as a passive relay between the wireless radio 106 and end users within or outside of the LOS zone. In other implementations, the reflectarray antennas 110-112 can serve as an active relay by providing an increase in transmission power to the reflected wireless signals. End users in a NLOS zone can receive wireless signals from the wireless radio 106 that are reflected from the reflectarray antennas 110-112. In some aspects, the reflectarray antenna 110 may receive a single RF signal from the wireless radio 106 and redirect that signal into a focused beam 116 to a targeted location or direction. In other aspects, the reflectarray antenna 112 may receive a single RF signal from the wireless radio 106 and redirect that signal into multiple reflected signals 118 at different phases to different locations. Various configurations, shapes, and dimensions may be used to implement specific designs and meet specific constraints. The reflectarray antennas 110-112 can be designed to directly reflect the wireless signals from the wireless radio 106 in specific directions from any desired location in the illustrated environment, be it in a suburban quiet area or a high traffic, high density city block.

For the UEs and others in the outdoor environment 100, the reflectarray antennas 110-112 can achieve a significant performance and coverage boost by reflecting RF signals from BS 102 and/or the wireless radio 106 to strategic directions. The design of the reflectarray antennas 110-112 and the determination of the directions that each respective reflectarray needs to achieve wireless coverage and performance improvements take into account the geometrical configurations of the outdoor environment 100 (e.g., placement of the wireless radio 106, distances relative to the reflectarray antennas 110-112, etc.) as well as link budget calculations from the wireless radio 106 to the reflectarray antennas 110-112 in the outdoor environment 100.

Figure 2:
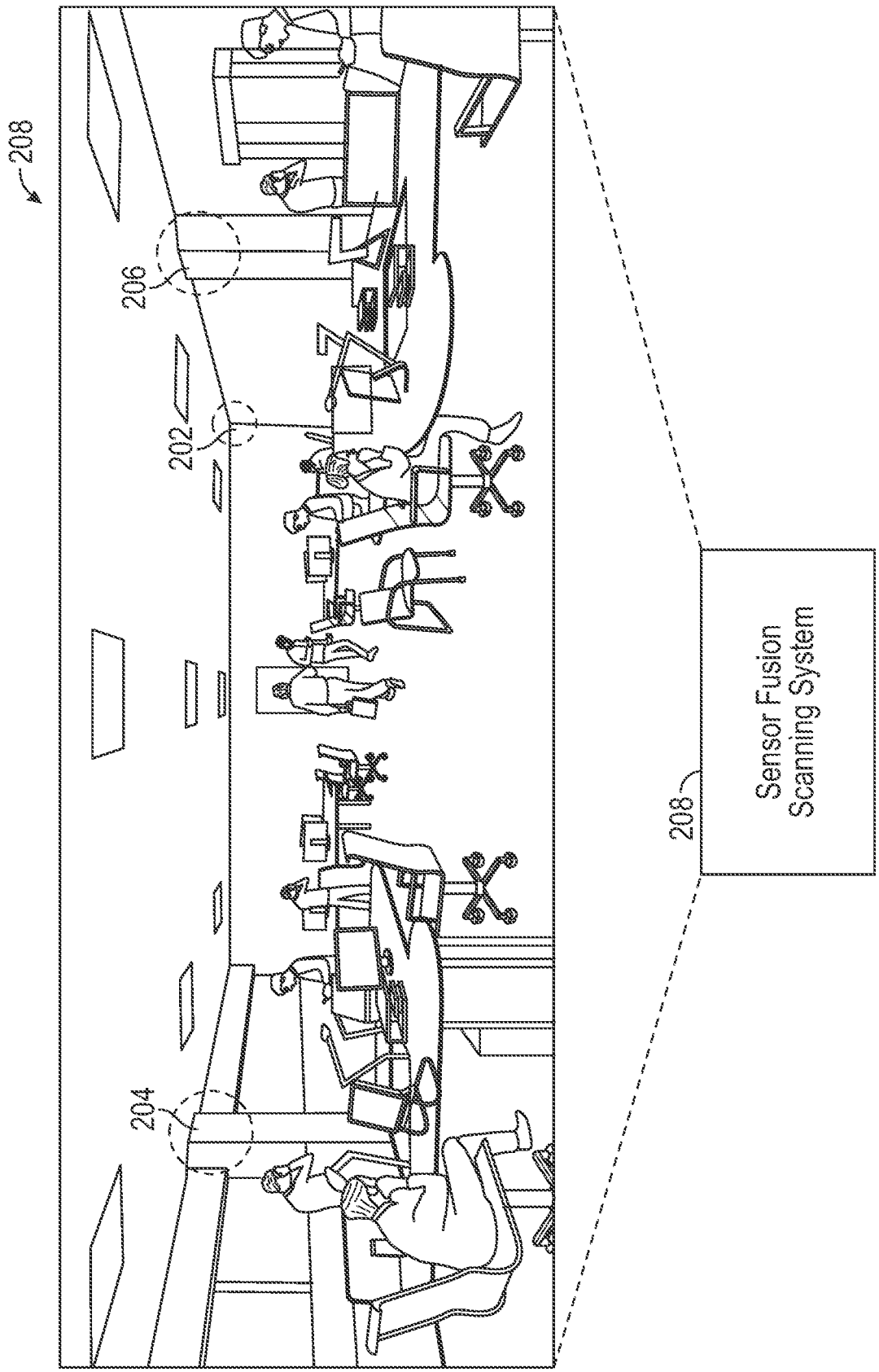
FIG. 2 illustrates placement of reflectarrays in an indoor wireless environment according to various examples.

FIG. 2 illustrates placement of reflectarrays in an indoor wireless environment according to various examples. Room 200 has a wireless radio 202 placed in one of its corners. Radio 202 provides wireless coverage to UE in room 200, such as within a fixed wireless network. There may be any number of UE in room 200 at any given time with a high demand for high speed data communications. Placement of reflectarrays 204-206 in pre-determined locations enables RF waves from UE in room 200 to reach wireless radio 202 and provide a performance boost. The performance boost achieved by the reflectarrays 204-206 is due to the constructive effect of the directed beams reflected from all their reflector elements. Note that the constructive effect is achieved with a passive (or active), low cost and easy to manufacture reflectarray that is crucial for enabling 5G and other data intensive wireless applications. In addition to many configurations, the reflectarrays disclosed herein are able to generate narrow or broad beams as desired, e.g., narrow in azimuth and broad in elevation, at different frequencies (e.g., single, dual, multi-band or broadband), with different materials, and so forth. The reflectarrays can reach a wide range of directions and locations in any wireless environment. These reflectarrays are low cost, easy to manufacture and set up, and may be self-calibrated without requiring manual adjustment to its operation. The design and placement of the reflectarrays 204-206 are determined by the sensor fusion scanning system 208, as described in more detail below.

Figure 3:
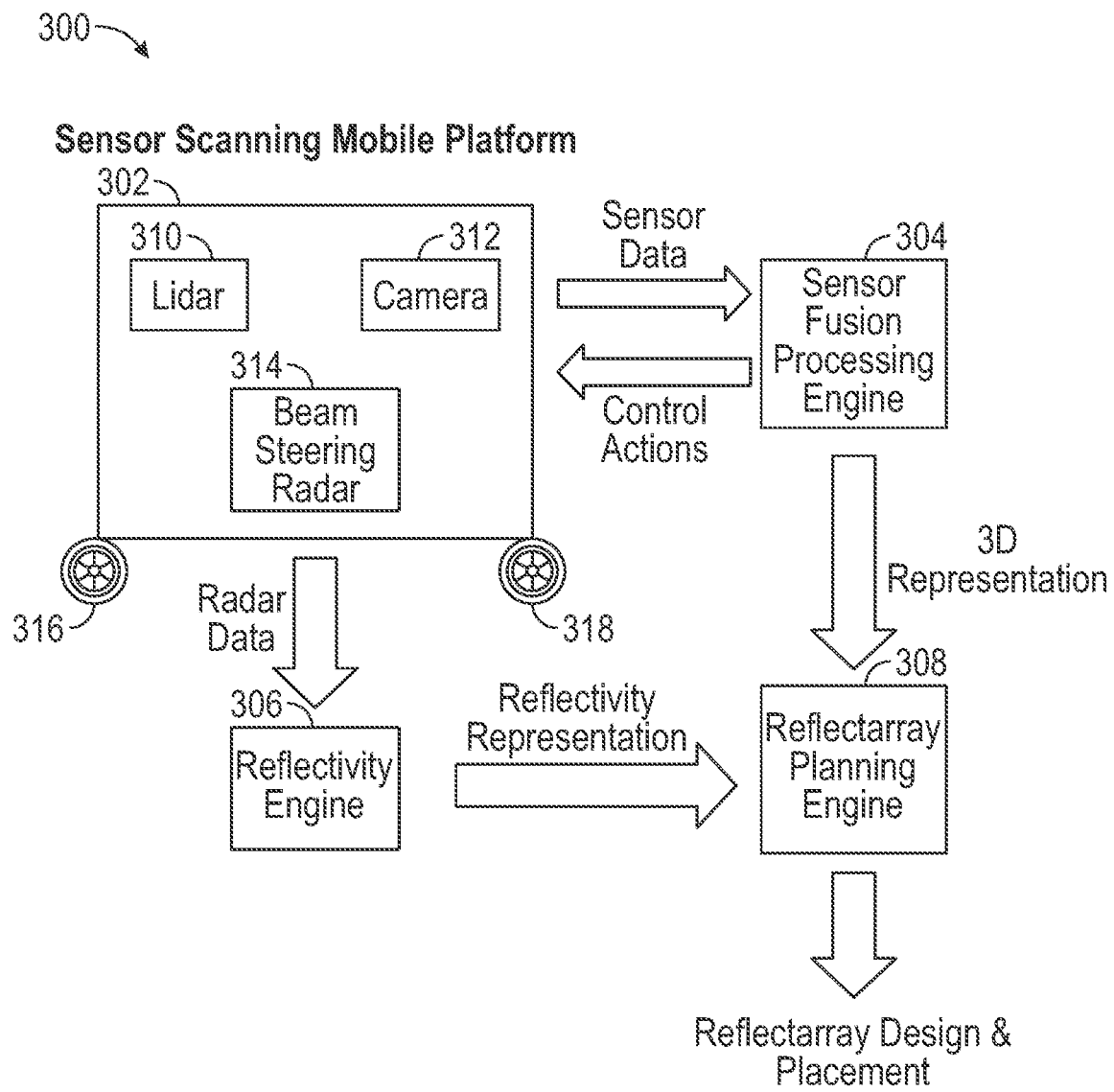
FIG. 3 illustrates a schematic diagram for a sensor fusion scanning system in accordance with various implementations of the subject technology.

Attention is now directed to FIG. 3, which illustrates a schematic diagram for a sensor fusion scanning system 300 in accordance with various implementations of the subject technology. Sensor fusion scanning system 300 includes a sensor scanning mobile platform 302, a sensor fusion processing engine 304, a reflectivity engine 306 and a reflectarray planning engine 308. The sensor scanning mobile platform 302 includes multiple sensors for scanning a wireless network environment, whether indoors or outdoors. In the illustrated example, the sensor scanning mobile platform 302 includes a lidar sensor 310, a camera sensor 312, and a beam steering radar sensor 314. Not all of the sensors 310-314 may be used, however, and one or more implementations of the sensor scanning mobile platform 302 may include additional sensors not included in the figure. Variations in the arrangement and type of the sensors 310-314 may be made without departing from the scope of the claims set forth herein. Additional sensors, different sensors, or fewer sensors may be provided.

The sensor scanning mobile platform 302 can actively estimate distances to environmental and/or structural features while scanning through a scene or wireless environment (e.g., conference room, stadium, city block, etc.). In various examples, the sensor scanning mobile platform 302 is equipped with a set of wheels 316-18 to enable the platform 302 to move within the scene while acquiring data on objects (e.g., walls, signs, moving vehicles, pedestrians, etc.) in the scene with its sensors. Individual point positions are measured by lidar sensor 310 emitting an optical signal pulse and detecting a returning optical signal pulse reflected from an object within the scene and determining the distance to the object based on a time delay between the emitted pulse and the reception of the reflected pulse. Similarly, the beam steering radar 314 steers RF signals across a full 360° FoV and receives their reflection from objects in the scene. The scene is also captured by camera sensor 312. With the lidar sensor 310, camera sensor 312 and beam steering radar 314, the sensor scanning mobile platform 302 can rapidly and repeatedly scan across the scene to provide continuous real-time information on distances to reflective objects in the scene.

The data acquired by the sensors in the sensor scanning mobile platform 302 is sent to the sensor fusion processing engine 304 for processing. The sensor fusion processing engine 304 renders a 3D representation of the scanned scene from the received data. In some implementations, the sensor fusion processing engine 304 may include one or more neural networks to detect and identify any reflective objects in the scene. The sensor fusion processing engine 304 also determines one or more control actions to be performed by the sensor scanning mobile platform 302 based on the detection and identification of such reflective objects. For example, the one or more control actions may include signaling that causes the sensor scanning mobile platform 302 to adjust the range of scanning angles for the beam steering radar 314, adjust the number of light pulses being emitted by the lidar sensor 310, adjust the intensity of the light pulses, and so forth. In some implementations, the sensor scanning mobile platform 302 can be deployed autonomously with autopilot instructions and control actions given by the sensor fusion processing engine 304.

Figure 4:
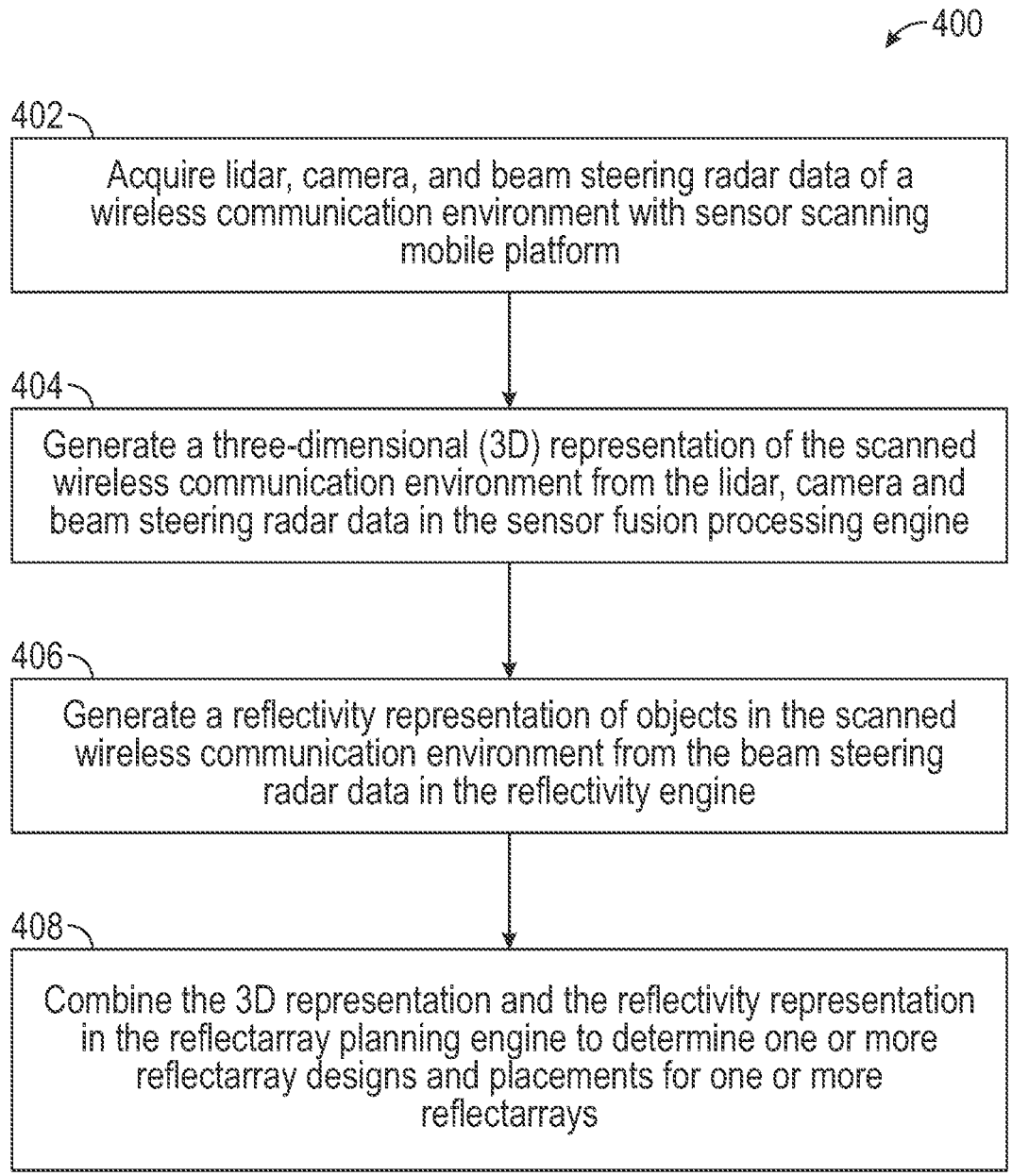
FIG. 4 is a flowchart of an example process for a sensor fusion method for wireless planning, in accordance with various implementations of the subject technology.

In addition to generating a 3D representation of the wireless environment, the sensor fusion scanning system 300 also generates a reflectivity representation of the surfaces and objects in the environment. This is done by taking the data generated by the beam steering radar sensor 314 and computing the reflectivity of the surfaces and objects in the environment from the reflected RF signals in the reflectivity engine 306. The 3D representation and the reflectivity representation paint a complete picture of the wireless environment for network planning, including the design and placement of reflectarrays in the wireless environment by the reflectarray planning engine 308 to improve wireless coverage in the environment. In various implementations, the sensor fusion processing engine 304 and the reflectivity engine 306 may be combined into FIG. 4 illustrates a flowchart of an example process for a sensor fusion method for wireless planning, in accordance with various implementations of the subject technology. For explanatory purposes, the example process 400 is primarily described herein with reference to the sensor fusion scanning system 300 of FIG. 3; however, the example process 400 is not limited to the scanning system 300 of FIG. 3, and the example process 300 can be performed by one or more other components of the sensor fusion scanning system 300 of FIG. 3. Further for explanatory purposes, the blocks of the example process 400 are described herein as occurring in series, or linearly. However, multiple blocks of the example process 400 can occur in parallel. In addition, the blocks of the example process 400 can be performed in a different order than the order shown and/or one or more of the blocks of the example process 400 are not performed.

The example process 400 begins at step 402, with the sensor scanning mobile platform 302 obtaining lidar, camera and beam steering radar data of a wireless communication environment (e.g., conference room, stadium, campus, etc.). The data is acquired while the sensor scanning mobile platform moves within the environment while acquiring data on objects (e.g., walls, signs, moving vehicles, pedestrians, etc.) in the scene with its sensor. The acquired lidar, camera and beam steering radar data is then input into the sensor fusion processing engine 304 to generate a 3D representation of the scanned environment (404). A reflectivity representation of the objects in the environment is generated by the reflectivity engine 306 at step 406. Lastly, at step 408, the 3D and reflectivity representations are combined in the reflectarray planning engine 308 to determine one or more reflectarray designs and placements for one or more reflectarrays. The reflectarrays are designed and placed in strategic locations in the environment to increase the performance of the wireless network, boosting the wireless signals and providing coverage to UE in both LOS and NLOS areas.

Figure 5:
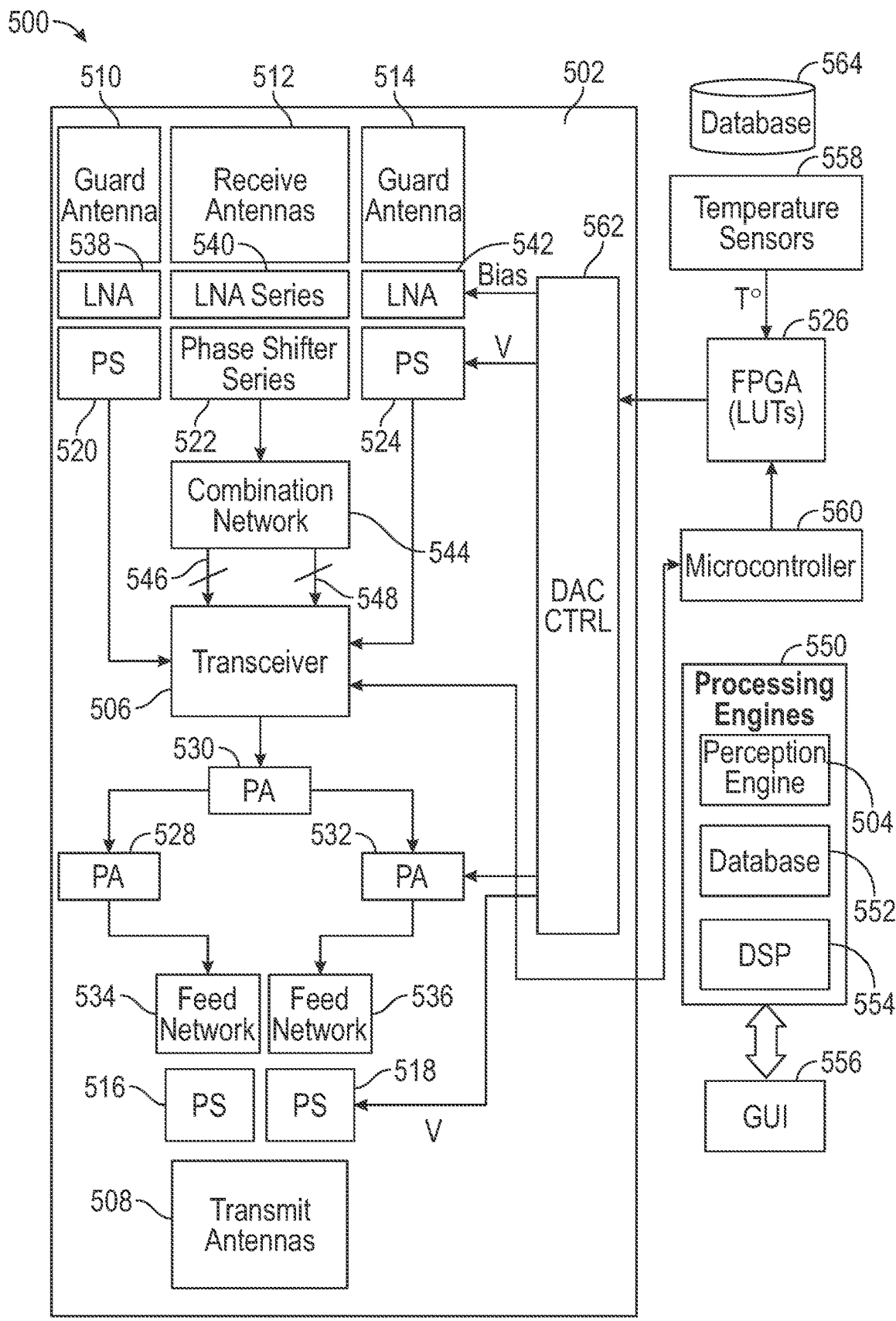
FIG. 5 illustrates a schematic diagram of a beam steering radar for use with the sensor scanning mobile platform of FIG. 3 in accordance with various implementations of the subject technology.

Attention is now directed to FIG. 5, which illustrates a schematic diagram of a beam steering radar 500 for use with the sensor scanning mobile platform 302 of FIG. 3 in accordance with various implementations of the subject technology. The beam steering radar 500 includes a radar module 502 that comprises a receive chain and a transmit chain. The receive chain includes receive antennas 512 (which may include more than one antenna), receive guard antennas 510 and 514, low-noise amplifiers ("LNAs") 538-42, phase shifter ("PS") circuits 520-24, and combination networks 544. The transmit chain includes power amplifiers ("PAs") 528-32, feed networks 534-36, PS circuits 516-18, and transmit antennas 508. The radar module 502 also includes a transceiver 506, a digital-to-analog (DAC) controller 562, a Field-Programmable Gate Array ("FPGA") 526, a microcontroller 560, processing engines 550, a General User Interface ("GUI") 556, temperature sensors 568 and a database 562. The processing engines 550 includes perception engine 504, database 552 and Digital Signal Processor ("DSP") 554. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

Radar module 502 is capable of both transmitting RF signals within a FoV and receiving the reflections of the transmitted signals as they reflect off of objects in the FoV. With the use of analog beamforming in radar module 502, a single transmit and receive chain can be used effectively to form a directional, as well as a steerable, beam. A transceiver 506 in radar module 502 can generate signals for transmission through a series of transmit antennas 508 as well as manage signals received through a series of receive antennas 512. Beam steering within the FoV is implemented with PS circuits 616 and 618 coupled to the transmit antennas 608 and 609, respectively, on the transmit chain and PS circuits 522 coupled to the receive antennas 512, on the receive chain. Careful phase and amplitude calibration of the transmit antennas 508 and receive antennas 612 can be performed in real-time with the use of couplers (not shown) integrated into the radar module 502. In other implementations, calibration is performed before the radar is deployed in an ego vehicle and the couplers may be removed.

The use of PS circuits 516-18 and 522 enables separate control of the phase of each element in the transmit antennas 508 and receive antennas 512. Unlike early passive architectures, the beam is steerable not only to discrete angles but to any angle (i.e., from 0° to 360°) within the FoV using active beamforming antennas. A multiple element antenna can be used with an analog beamforming architecture where the individual antenna elements may be combined or divided at the port of the single transmit or receive chain without additional hardware components or individual digital processing for each antenna element. Further, the flexibility of multiple element antennas allows narrow beam width for transmit and receive. The antenna beam width decreases with an increase in the number of antenna elements. A narrow beam improves the directivity of the antenna and provides the radar system 500 with a significantly longer detection range.

The major challenge with implementing analog beam steering is to design PSs to operate at 77 GHz. PS circuits 516-18 and 520-24 solve this problem with a reflective PS design implemented with a distributed varactor network fabricated using suitable semiconductor materials, such as Gallium-Arsenide (GaAs) materials, among others. Each PS circuit 516-18 and 520-24 has a series of PSs, with each PS coupled to an antenna element to generate a phase shift value of anywhere from 0° to 360° for signals transmitted or received by the antenna element. The PS design is scalable in future implementations to other semiconductor materials, such as Silicon-Germanium (SiGe) and CMOS, bringing down the PS cost to meet specific demands of customer applications. Each PS circuit 516-18 and 520-24 is controlled by FPGA 526, which provides a series of voltages to the PSs in each PS circuit that results in a series of phase shifts.

The DAC controller 562 is coupled to each of the LNAs 538-42, PS circuits 516-18 and 520-24, and the PAs 528-32. In some aspects, the DAC controller 562 is coupled to the FPGA 526, and the FPGA 526 can drive digital signaling to the DAC controller 562 to provide analog signaling to the LNAs 538-42, the PS circuits 516-18 and 520-22, and the PAs 528-32. In some implementations, the DAC controller 562 is coupled to the combination networks 544 and to the feed networks 534-36.

In various examples, an analog control signal is applied to each PS in the PS circuits 516-18 and 520-24 by the DAC controller 562 to generate a given phase shift and provide beam steering. The analog control signals applied to the PSs in PS circuits 516-18 and 520-24 are based on voltage values that are stored in Look-up Tables ("LUTs") in the FPGA 526. These LUTs are generated by an antenna calibration process that determines which voltages to apply to each PS to generate a given phase shift under each operating condition. Note that the PSs in PS circuits 516-18 and 520-24 can generate phase shifts at a very high resolution of less than one degree. This enhanced control over the phase allows the transmit and receive antennas in radar module 502 to steer beams with a very small step size, improving the capability of the radar system 500 to resolve closely located targets at small angular resolution.

In various examples, each of the transmit antennas 508 and the receive antennas 512 may be a metastructure antenna, a phase array antenna, or any other antenna capable of radiating RF signals in millimeter wave frequencies. A metastructure, as generally defined herein, is an engineered structure capable of controlling and manipulating incident radiation at a desired direction based on its geometry. Various configurations, shapes, designs and dimensions of the transmit antennas 508 and the receive antennas 512 may be used to implement specific designs and meet specific constraints.

The transmit chain in the radar module 502 starts with the transceiver 506 generating RF signals to prepare for transmission over-the-air by the transmit antennas 508. The RF signals may be, for example, Frequency-Modulated Continuous Wave ("FMCW") signals. An FMCW signal enables the radar system 500 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular and so forth, each having advantages and purposes.

Once the FMCW signals are generated by the transceiver 506, the FMCW signals are divided and distributed through feed networks 534-36, respectively, which form a power divider system to divide an input signal into multiple signals, one for each element of the transmit antennas 508, respectively. The feed networks 534-36 may divide the signals so power is equally distributed among them or alternatively, so power is distributed according to another scheme, in which the divided signals do not all receive the same power. Each signal from the feed networks 534-36 is then input to the PS circuits 516-18, respectively, where the FMCW signals are phase shifted based on control signaling from the DAC controller 562 (corresponding to voltages generated by the FPGA 526 under the direction of microcontroller 560), and then transmitted to the PAs 528-32. Signal amplification is needed for the FMCW signals to reach the long ranges desired for object detection, as the signals attenuate as they radiate by the transmit antennas 508.

The microcontroller 560 determines which phase shifts to apply to the PSs in PS circuits 516-18 and 520-24 according to a desired scanning mode based on road and environmental scenarios. Microcontroller 560 also determines the scan parameters for the transceiver to apply at its next scan. The scan parameters may be determined at the direction of one of the processing engines 550, such as at the direction of perception engine 504. Depending on the objects detected, the perception engine 504 may instruct the microcontroller 560 to adjust the scan parameters at a next scan to focus on a given area of the FoV or to steer the beams to a different direction.

In various examples and as described in more detail below, radar system 500 operates in one of various modes, including a full scanning mode and a selective scanning mode, among others. In a full scanning mode, the transmit antennas 508 and the receive antennas 512 can scan a complete FoV with small incremental steps. Even though the FoV may be limited by system parameters due to increased side lobes as a function of the steering angle, radar system 500 is able to detect objects over a significant area for a long-range radar. The range of angles to be scanned on either side of boresight as well as the step size between steering angles/phase shifts can be dynamically varied based on the driving environment. To improve performance of an autonomous vehicle (e.g., an ego vehicle) driving through an urban environment, the scan range can be increased to keep monitoring the intersections and curbs to detect vehicles, pedestrians or bicyclists. This wide scan range may deteriorate the frame rate (revisit rate), but is considered acceptable as the urban environment generally involves low velocity driving scenarios. For a high-speed freeway scenario, where the frame rate is critical, a higher frame rate can be maintained by reducing the scan range. In this case, a few degrees of beam scanning on either side of the boresight would suffice for long-range target detection and tracking.

In a selective scanning mode, the radar system 500 scans around an area of interest by steering to a desired angle and then scanning around that angle. This ensures the radar system 500 is to detect objects in the area of interest without wasting any processing or scanning cycles illuminating areas with no valid objects. Since the radar system 500 can detect objects at a long distance, e.g., 300 m or more at boresight, if there is a curve in a road, direct measures do not provide helpful information. Rather, the radar system 500 steers along the curvature of the road and aligns its beams towards the area of interest. In various examples, the selective scanning mode may be implemented by changing the chirp slope of the FMCW signals generated by the transceiver 506 and by shifting the phase of the transmitted signals to the steering angles needed to cover the curvature of the road.

Objects are detected with radar system 500 by reflections or echoes that are received at the receive antennas 512 in the respective polarization. For receive operation, PS circuits 520-24 create phase differentials between radiating elements in the receive antennas 512 to compensate for the time delay of received signals between radiating elements due to spatial configurations. Receive phase-shifting, also referred to as analog beamforming, combines the received signals for aligning echoes to identify the location, or position of a detected object. That is, phase shifting aligns the received signals that arrive at different times at each of the radiating elements in receive antennas 512. Similar to PS circuits 516-18 on the transmit chain, PS circuits 520-24 are controlled by the DAC controller 562, which provides control signaling to each PS to generate the desired phase shift. In some aspects, the FPGA 526 can provide bias voltages to the DAC controller 562 to generate the control signaling to PS circuits 520-24.

The receive chain then combines the signals fed by the PS circuits 522 at the combination networks 544, from which the combined signals propagate to the transceiver 506 for receiver processing. Note that as illustrated, the combination networks 544 can generate multiple combined signals 546 and 548, of which each signal combines signals from a number of elements in the receive antennas 512, respectively. In one example, the receive antennas 512 include 128 and 64 radiating elements partitioned into two 64-element and 32-element clusters, respectively. For example, the signaling fed from each cluster is combined in a corresponding combination network (e.g., 644, 645) and delivered to the transceiver 506 in a separate RF transmission line. In this respect, each of the combined signals 546 and 548 can carry two RF signals to the transceiver 506, where each RF signal combines signaling from the 64-element and 32-element clusters of the receive antennas 512. Other examples may include 8, 26, 34, or 62 elements, and so on, depending on the desired configuration. The higher the number of antenna elements, the narrower the beam width.

In some implementations, the radar module 502 includes receive guard antennas 510 and 514 that generate a radiation pattern separate from the main beams received by the receive antennas 512. The receive guard antennas 510 and 514 are implemented to effectively eliminate side-lobe returns from objects. The goal is for the receive guard antennas 510 and 514 to provide a gain that is higher than the side lobes and therefore enable their elimination or reduce their presence significantly. The receive guard antennas 510 and 514 effectively act as a side lobe filter. Similarly, the radar module 502 may also include transmit guard antennas (not shown) to eliminate side lobe formation or reduce the gain generated by transmitter side lobes at the time of a transmitter main beam formation by the transmit antennas 508.

Once the received signals are received by transceiver 506, the received signals are processed by processing engines 550. Processing engines 550 include perception engine 504 that detects and identifies objects in the received signal with one or more neural networks using machine learning or computer vision techniques, database 564 to store historical and other information for radar system 500, and the DSP engine 554 with an Analog-to-Digital Converter (ADC) module to convert the analog signals from transceiver 506 into digital signals that can be processed to determine angles of arrival and other valuable information for the detection and identification of objects by perception engine 504. In one or more implementations, DSP engine 554 may be integrated with the microcontroller 560 or the transceiver 506.

Radar system 500 also includes a GUI 556 to enable configuration of scan parameters such as the total angle of the scanned area defining the FoV, the beam width or the scan angle of each incremental transmission beam, the number of chirps in the radar signal, the chirp time, the chirp slope, the chirp segment time, and so on as desired. In addition, radar system 500 has a temperature sensor 558 for sensing the temperature around the vehicle so that the proper voltages from FPGA 526 may be used to generate the desired phase shifts. The voltages stored in FPGA 526 are determined during calibration of the antennas under different operating conditions, including temperature conditions. Database 564 may also be used in radar system 500 to store radar and other useful data.

The radar data may be organized in sets of Range-Doppler (RD) map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception engine 504 controls further operation of the transmit antennas 508 by, for example, providing an antenna control signal containing beam parameters for the next RF beams to be radiated from the transmit antennas 508.

In operation, the microcontroller 560 is responsible for directing the transmit antennas 508 to generate RF beams in a respective polarization with determined parameters such as beam width, transmit angle, and so on. The microcontroller 560 may, for example, determine the parameters at the direction of perception engine 504, which may at any given time determine to focus on a specific area of a FoV upon identifying targets of interest in the ego vehicle's path or surrounding environment. The microcontroller 560 determines the direction, power, and other parameters of the RF beams and controls the transmit antennas 508 to achieve beam steering in various directions. Next, the transmit antennas 508 radiate RF beams having the determined parameters. The RF beams are reflected from targets in and around the ego vehicle's path (e.g., in a 360° field of view) and are received by the transceiver 506. The receive antennas 512 send the received radar data to the perception engine 404 for target identification.

In various examples, the perception engine 404 can store information that describes an FoV. This information may be historical data used to track trends and anticipate behaviors and traffic conditions or may be instantaneous or real-time data that describes the FoV at a moment in time or over a window in time. The ability to store this data enables the perception engine 404 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the perception engine 504 may determine to narrow the beam width for a more focused view of that sector or area in the FoV. The next scan may indicate the targets' length or other dimension, and if the target is a vehicle, the perception engine 504 may consider what direction the target is moving and focus the beams on that area. Similarly, the echo may be from a spurious target, such as a bird, which is small and moving quickly out of the path of the vehicle. The database 564 coupled to the perception engine 504 can store useful data for radar system 500, such as, for example, information on which subarrays of the transmit antennas 508 perform better under different conditions.

All of these detection scenarios, analysis and reactions may be stored in the perception engine 504. Information on the detected objects is then sent to the reflectivity engine 306 for computing their reflectivity. The reflectivity of the detected objects together with the 3D representation of the wireless environment enable the design and planning of reflectarrays in the wireless environment to enhance the wireless performance and coverage. The reflectarrays and their design process are described in more detail below with reference to FIGS. 6-18.

Figure 6:
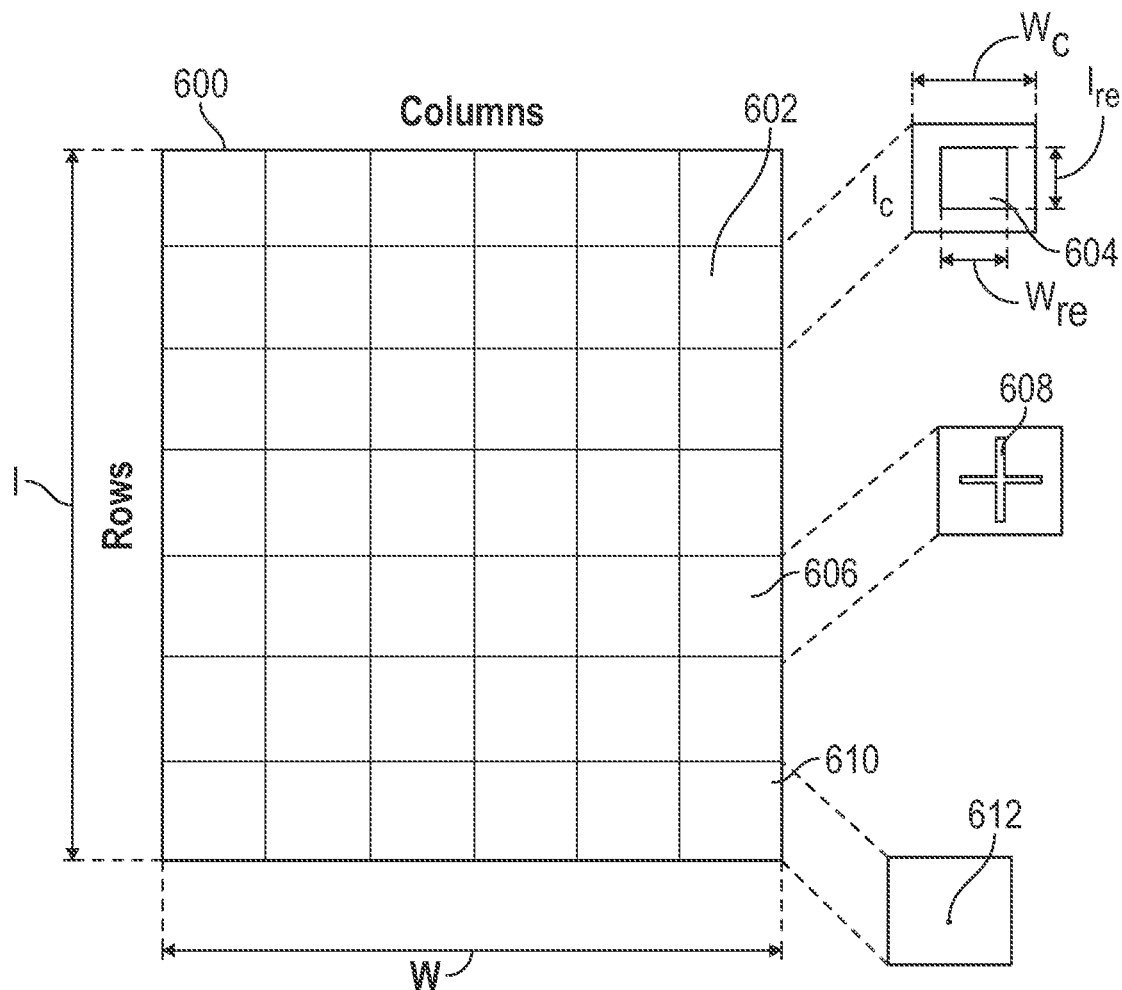
FIG. 6 is a schematic diagram of a focused metastructure based reflectarray and its cell configuration in accordance to various implementations of the subject technology.
Figure 7:
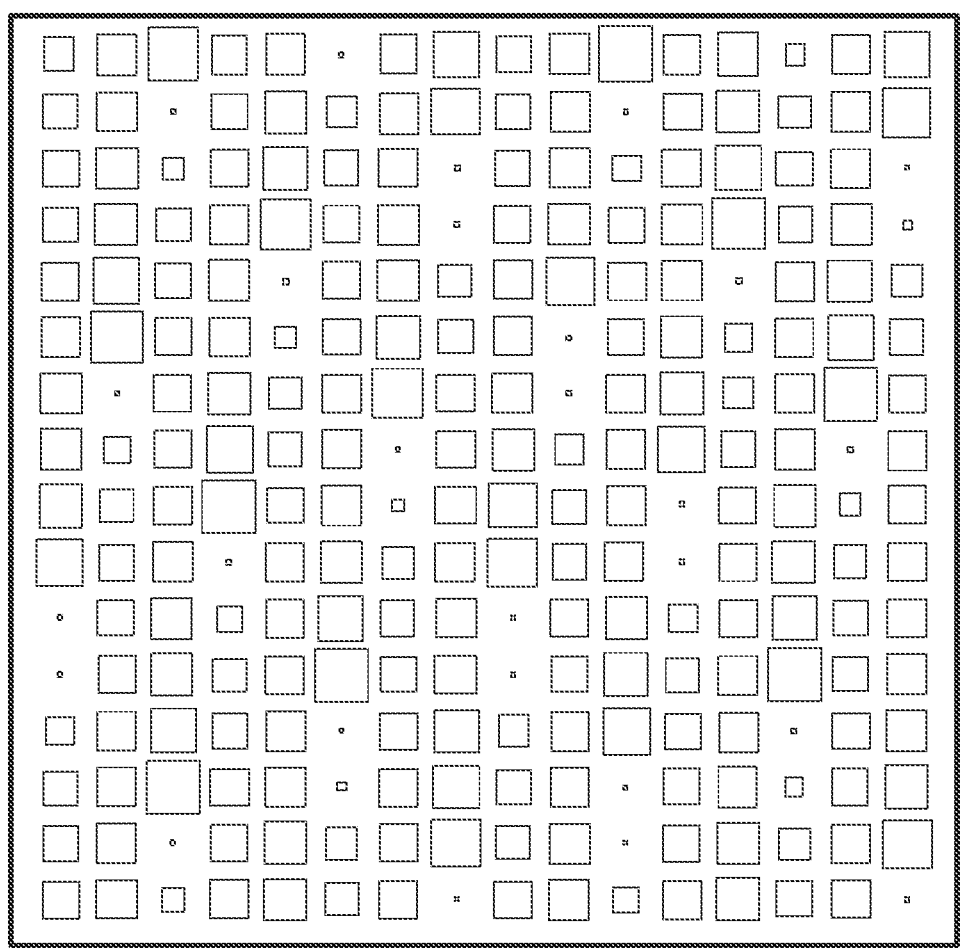
FIG. 7 illustrates an example reflectarray in accordance with various implementations of the subject technology.

Attention is now directed to FIG. 6, which shows a schematic diagram of a focused metastructure based reflectarray and its cell configuration in accordance to various examples. Reflectarray 600 is an array of cells organized in rows and columns. The reflectarray 600 may be passive or active. A passive reflectarray does not require electronics or other controls, as once in position it directs incident beams into a specific focused direction. To change the direction may require repositioning the entire reflectarray, which can be achieved by means of mechanical or electronically controlled rotating mounts on the back of the reflectarray 600. The reflectarray 600 provides directivity and high bandwidth and gain due to the size and configuration of its individual cells and the individual reflector elements within those cells.

In various examples, the cells in the reflectarray 600 are metastructure ("MTS") cells with MTS reflector elements. In other examples, the reflectarray cells may be composed of microstrips, gaps, patches, and so forth. Various configurations, shapes, and dimensions may be used to implement specific designs and meet specific constraints. As illustrated, reflectarray 600 may be a rectangular reflectarray with a length l and a width w. Other shapes (e.g., trapezoid, hexagon, etc.) may also be designed to satisfy design criteria for a given 5G or other wireless application, such as the location of the reflectarray relative to a BS, the desired gain and directivity performance, and so on. Each cell in the reflectarray 600 has a reflector element. The reflector elements may also have different configurations, such as a square reflector element, a rectangular reflector element, a dipole reflector element, a miniature reflector element, and so on.

For example, cell 602 is a rectangular cell of dimensions $w_c$ and $l_c$ for its width and length, respectively. Within cell 602 is a MTS reflector element 604 of dimensions $w_{re}$ and $l_{re}$. As a MTS reflector element, its dimensions are in the sub-wavelength range ($\sim \lambda/3$), with $\lambda$ indicating the wavelength of its incident or reflected RF signals. In other examples, cell 606 has a dipole element 608 and cell 610 has a miniature reflector element 612, which is effectively a very small dot in an etched or pattern PCB metal layer that may be imperceptible to the human eye. As described in more detail below, the design of the reflectarray 600 is driven by geometrical and link budget considerations for a given application or deployment, whether indoors or outdoors. The dimensions, shape and cell configuration of the reflectarray 600 will therefore depend on the particular application. Each cell in the reflectarray 600 may have a different reflector element, as illustrated with the reflectarray 700 shown in FIG. 7.

Figure 8:
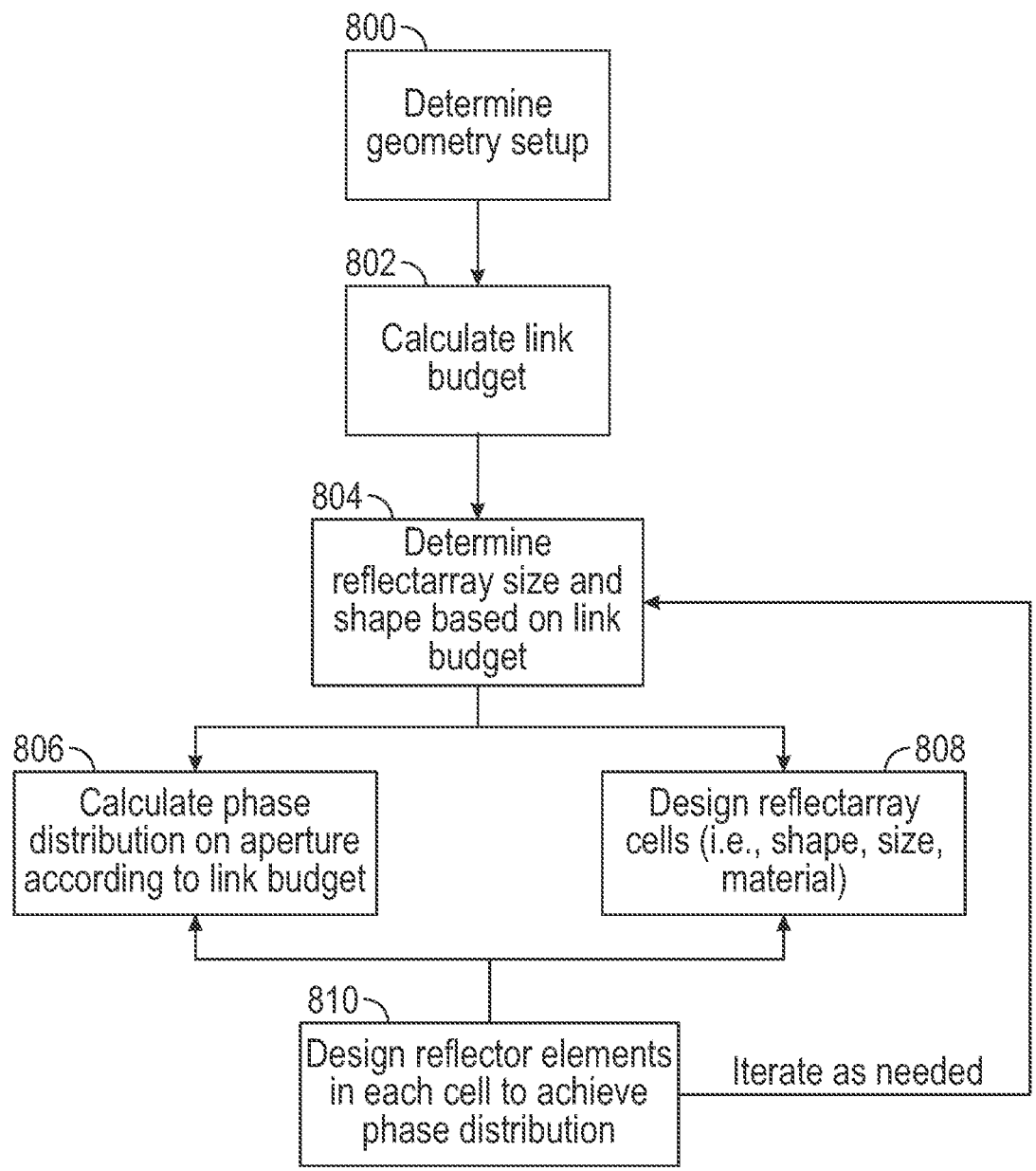
FIG. 8 illustrates a process for designing a reflectarray according to the various implementations of the subject technology disclosed herein.
Figure 9:
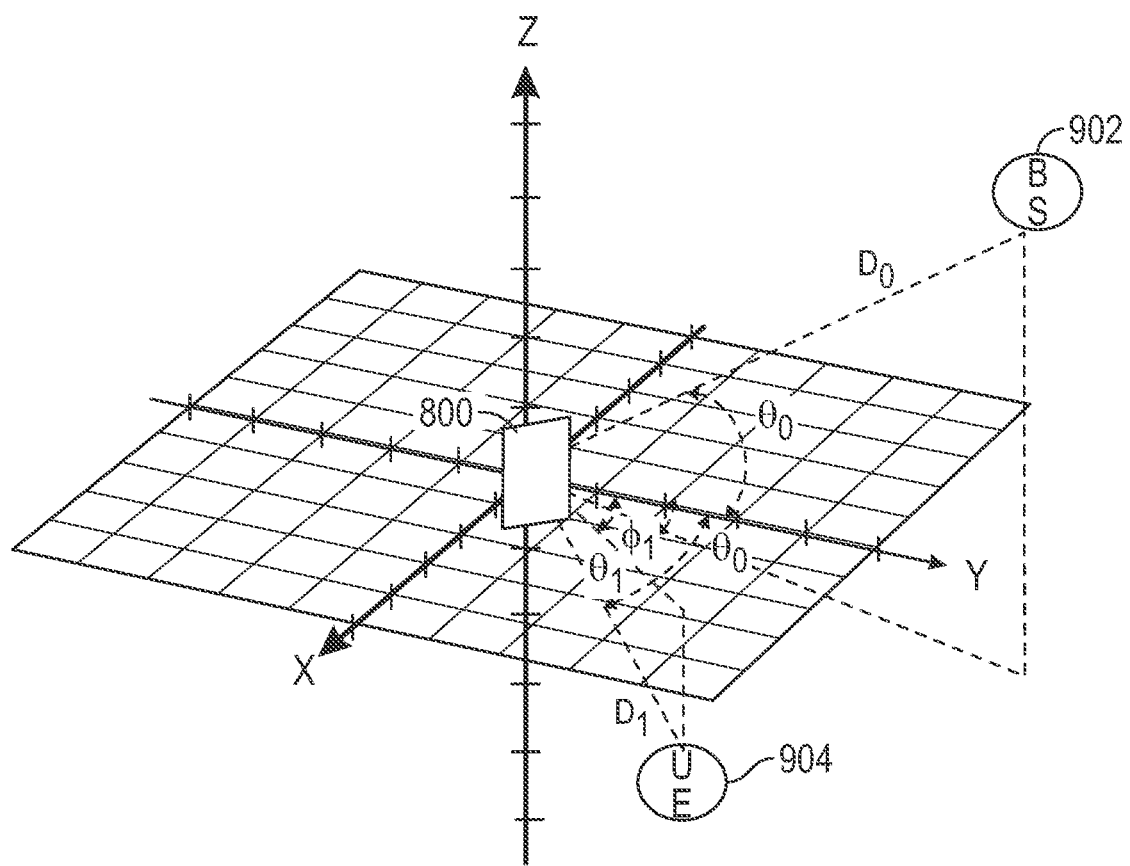
FIG. 9 is a schematic diagram of an example reflectarray relative to a base station and user equipment in accordance to various implementations of the subject technology.

FIG. 8 illustrates the process for designing a reflectarray according to the various examples disclosed herein. The first step in the design process is to determine the geometry setup (800). This involves determining the position of the BS within the wireless network, including its distance from the reflectarray, and the orientation and position of the reflectarray itself. The geometry setup can be seen in FIG. 9, which shows a BS 902 located at $D_0$ from a Cartesian (x, y, z) coordinate system positioned in the center of the reflectarray 900. The reflectarray 900 is positioned along the x-axis with the y-axis indicating its boresight. The BS 902 has an elevation angle $\theta_0$ and an azimuth angle $\varphi_0$. Note that determining the geometry setup is a simple procedure involving simple geometrical tools such as, for example, a laser distance measurer and an angles measurer. This highlights the ease of setup of reflectarray 500 and further incentivizes its use when its significant wireless coverage and performance improvements are achieved at low cost with a highly manufacturable reflectarray that can be easily deployed in any 5G environment, whether indoors or outdoors.

Figure 10:
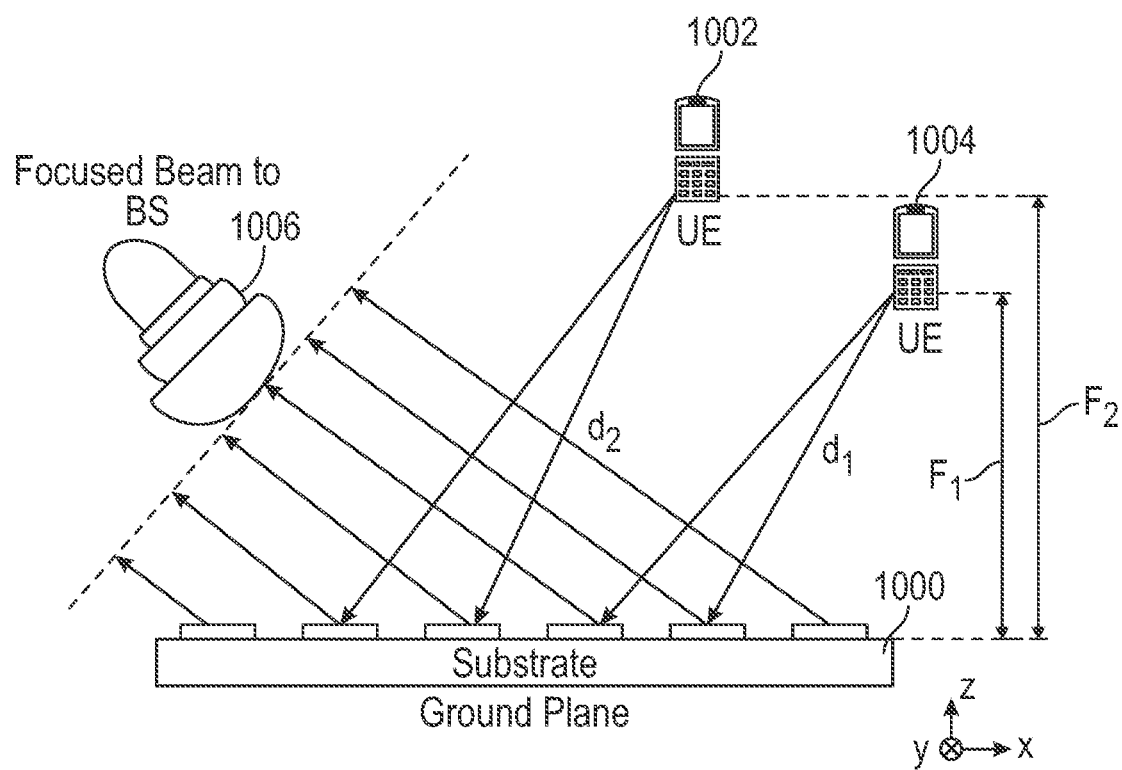
FIG. 10 is a schematic diagram of another example reflectarray relative to a base station and user equipment in accordance to various implementations of the subject technology

The reflectarray 900 can be used to reflect incident RF waves from UE within the 5G network served by BS 902, such as, for example, UE 904 located at a distance $D_1$ from the reflectarray 900 with $\theta_1$ elevation and $\varphi_1$ azimuth angles. FIG. 10 illustrates a far field radiation pattern 1006 that is generated from reflectarray 1000 having a metal ground plane, a dielectric substrate and a patterned metal layer with the reflectarray cells having reflector elements, e.g., MTS reflector elements. As illustrated, UE 1002 and UE 1004 send RF signals to reflectarray 1000 from respective distances of $d_1$ and $d_2$. Those RF signals are then reflected from each cell in reflectarray 1000 with a focused radiation pattern 1006 directed to the BS serving UE 1002-1004. The constructive behavior of the RF beams from all cells in reflectarray 1000 is effectively an antenna gain that results in significant improvements in wireless coverage and performance to UE communicating with a BS within the vicinity of reflectarray 1000.

Returning to FIG. 8, once the geometry setup is determined, the next step is to calculate a link budget for the 5G application (802). The link budget is a calculation that takes as inputs parameters identifying the gain profile of the BS (e.g., BS 802) such as, for example, its center frequency, bandwidth, Tx power (EIRP), antenna gain (beam-width), polarization, Rx sensitivity, and location ($D_0$, $\theta_0$, $\varphi_0$), and parameters or gain profile of an UE within reach of the BS (e.g., UE 904) such as, for example, its Tx power (EIRP), antenna gain (beam-width), polarization, Rx sensitivity, and location ($D_1$, $\theta_1$, $\varphi_1$). The output of the link budget calculation determines the size and shape of the reflectarray, as well as its expected gain, beam-width and location in terms of azimuth and elevation angles for both uplink and downlink communications (804).

Once the shape and size of the reflectarray are determined, the next two steps can be performed sequentially or in parallel: the phase distribution on the reflectarray aperture is determined according to the link budget (806) and the reflectarray cells are designed, i.e., their shape, size, and material are selected (808). The reflection phase, $\varphi_r$, for an $i^{th}$ cell in the reflectarray is calculated as follows:

$$\varphi_r = k_0(d_1 - (x_i \cos \varphi_0 + y_i \sin \varphi_0)\sin \theta_0) \pm 2N\pi \quad \text{(Eq. 1)}$$

wherein $k_0$ is the free space propagation constant, $d_i$ is the distance from the BS to the $i^{th}$ cell in the reflectarray, N is an integer for phase wrapping, and $\varphi_0$ and $\theta_0$ are the azimuth and elevation angles for the target reflection point. The calculation identifies a desired or required reflection phase $\varphi_r$ by the $i^{th}$ element on the x-y plane to point a focused beam to ($\varphi_0$, $\theta_0$). $d_i$, is the distance from the phase center of the BS to the center of the $i^{th}$ cell, and N is an integer. This formula and equation may further include weights to adapt and adjust specific cells or sets of cells. In some examples, a reflectarray may include multiple subarrays allowing redirection of a received signal in more than one direction, frequency, and so forth.

The last step in the design process is to then design the reflector elements in each cell (e.g., their size, shape, type, etc.) to achieve the phase distribution on the reflectarray aperture (810). The design process steps 804-810 may be iterated as needed to adjust parameters such as by weighting some of the cells, adding a tapering formulation, and so forth.

Once the reflectarray is designed, it is ready for placement and operation to significantly boost the wireless coverage and performance of any 5G or other wireless application, whether indoors or outdoors. Note that even after the design is completed and the reflectarray is manufactured and placed in an environment to enable high performance wireless applications, the reflectarray can still be adjusted with the use of say rotation mechanisms attached to the reflectarray. In addition to many configurations, the reflectarrays disclosed herein are able to generate a focused, directed narrow beam to improve wireless communications between UE and a BS serving the UE in a wireless network. The reflectarrays are low cost, easy to manufacture and set up, and may be self-calibrated without requiring a 5G or wireless network operator to adjust its operation. They may be passive or active and achieve MIMO like gains and enrich the multipath environment. It is appreciated that these reflectarrays effectively enable the desired performance and high speed data communications promises of 5G.

Figure 11:
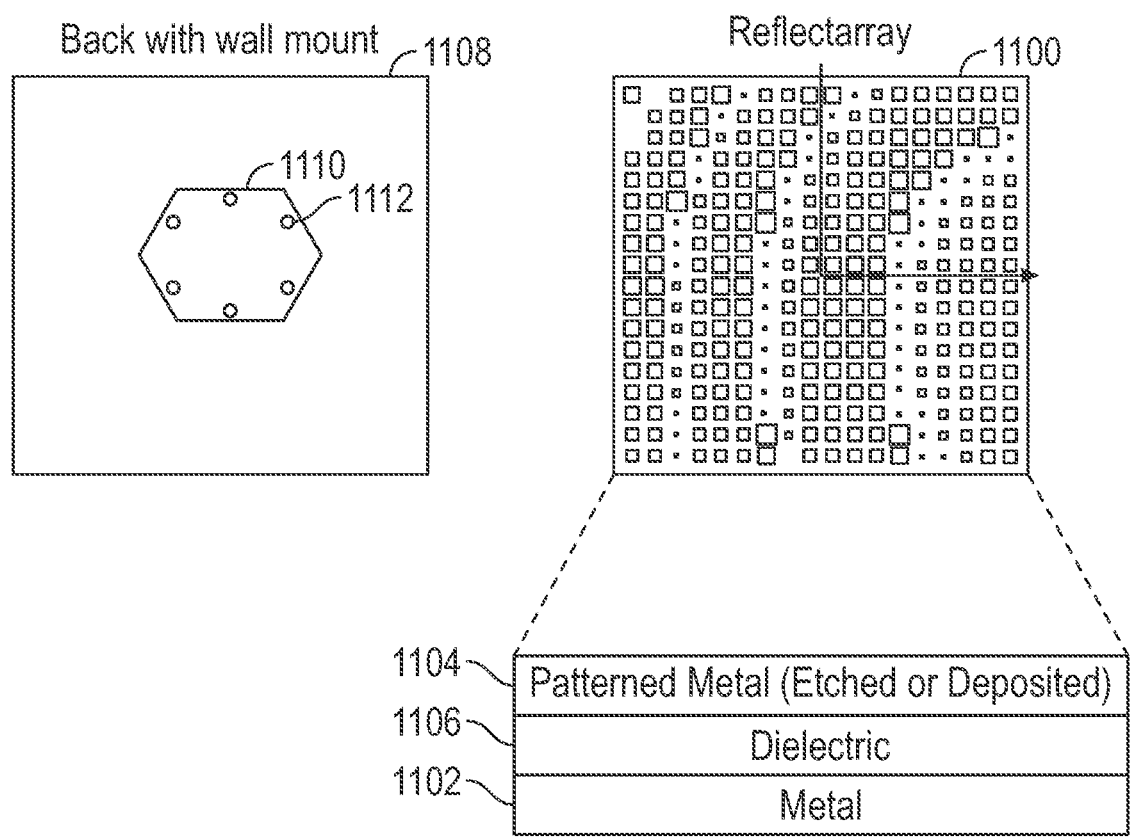
FIG. 11 illustrates a reflectarray with a wall mount in its back surface in accordance with various implementations of the subject technology.

FIG. 11 illustrates a reflectarray with a wall mount in its back surface in accordance with various examples. Reflectarray 1100 has high manufacturability as it can be made of low cost PCB materials suitable for high frequency operation. As illustrated, reflectarray 1100 has a metal ground plane 1102 and a patterned metal layer 1104 surrounding a dielectric material 1106. The reflector elements of the reflectarray 1100 can be etched or deposited into a metal material to form the patterned metal layer 1104. In various examples, the metal ground plane 1102 and the patterned metal layer 1104 are copper layers surrounding a composite dielectric material. Other materials may be used to design the reflectarray 1100, depending on the desired performance of a given 5G application. A back surface 1108 can be attached to the ground plane layer 1102 of reflectarray 1100 to provide a mount 1110 for a wall or other like surface. The wall mount 1110 may mount to the wall by means of screws 1112.

Figure 12:
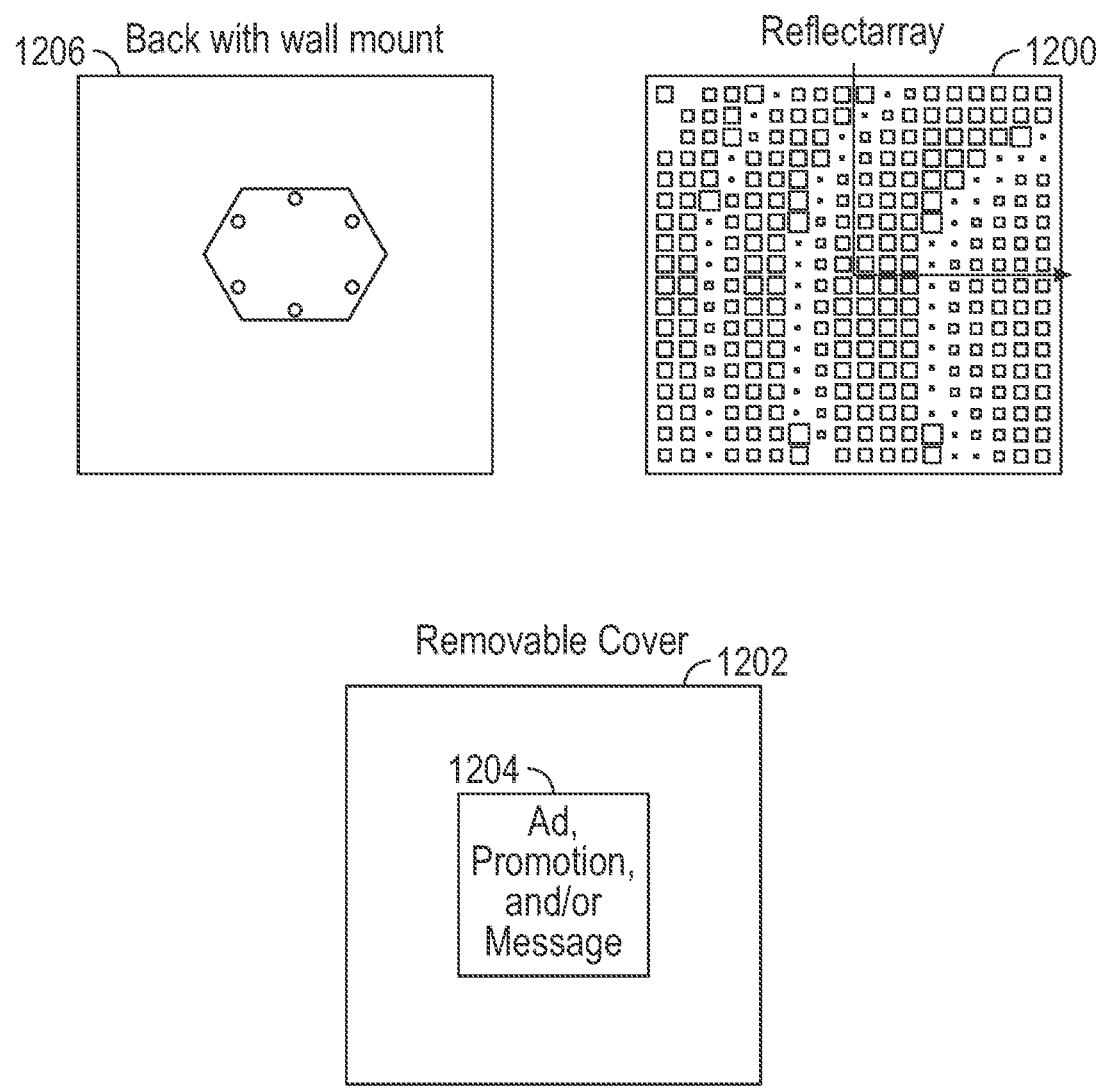
FIG. 12 illustrates a reflectarray with a removable cover in accordance to various implementations of the subject technology.

In various examples, a removable cover may be placed on top of the reflectarray as desired by the application. As shown in FIG. 12, reflectarray 1200 has a removable cover 1202 that may be positioned on top of the reflectarray by various means, such as by glue, silk screening, or other such means. Care must be taken during the design process of the reflectarray 1200 to select appropriate cover materials that will not interfere with the directivity performance of the reflected RF signals, e.g., fiberglass or other such materials. In various examples, the reflectarray 1200 can be designed and simulated with the removable cover 1202 to ensure that the reflectarray cells and their reflector elements will provide the desired performance. The removable cover 1202 may serve a dual purpose to protect the reflectarray 1200 from environmental or other damage to its surface and to enable 5G and other wireless network providers, emergency response systems, and others to show messages, advertisements or promotions in the reflectarray 1200 that are viewable by UE within its vicinity. There may be various configurations of cover 1202 that enable ads and messages to be relayed from the reflectarray 1200 mounted to a surface via back mount 1206.

Figure 13:
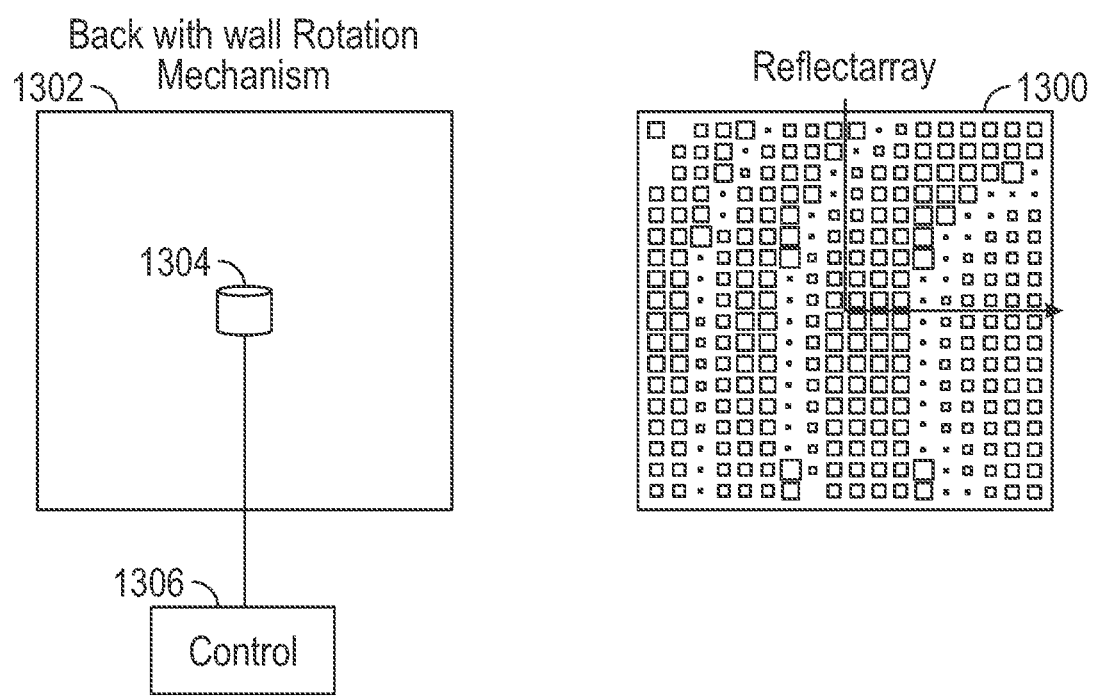
FIG. 13 illustrates a reflectarray with a rotation mechanism placed on its back surface in accordance to various implementations of the subject technology.
Figure 14:
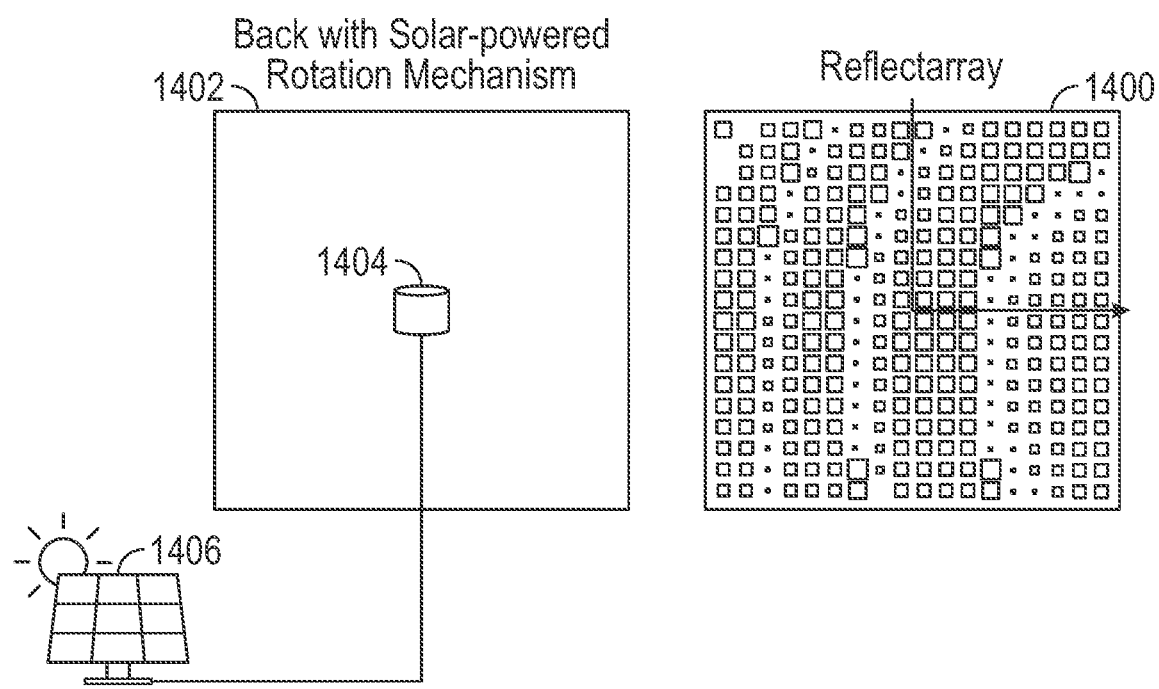
FIG. 14 illustrates a reflectarray with a solar controlled rotation mechanism placed on its back surface in accordance to various implementations of the subject technology.

Note that there may be various applications that may require the reflectarray to change its position without having to place another reflectarray in the environment. FIG. 13 illustrates an example reflectarray 1300 that has a rotation mechanism 1304 placed on its back surface 1302 that may be mountable to a wall or other such surface. The rotating mechanism 1304 may be controllable by control circuit 1006 to change the orientation of the reflectarray 1300 as desired. The rotation mechanism can also be controlled by other means other than control circuitry 1306, such as, for example, a solar cell. FIG. 14 illustrates such a reflectarray 1400 in which a rotating mechanism 1404 on back surface 1402 is controlled by solar cell 1406.

Figure 15:
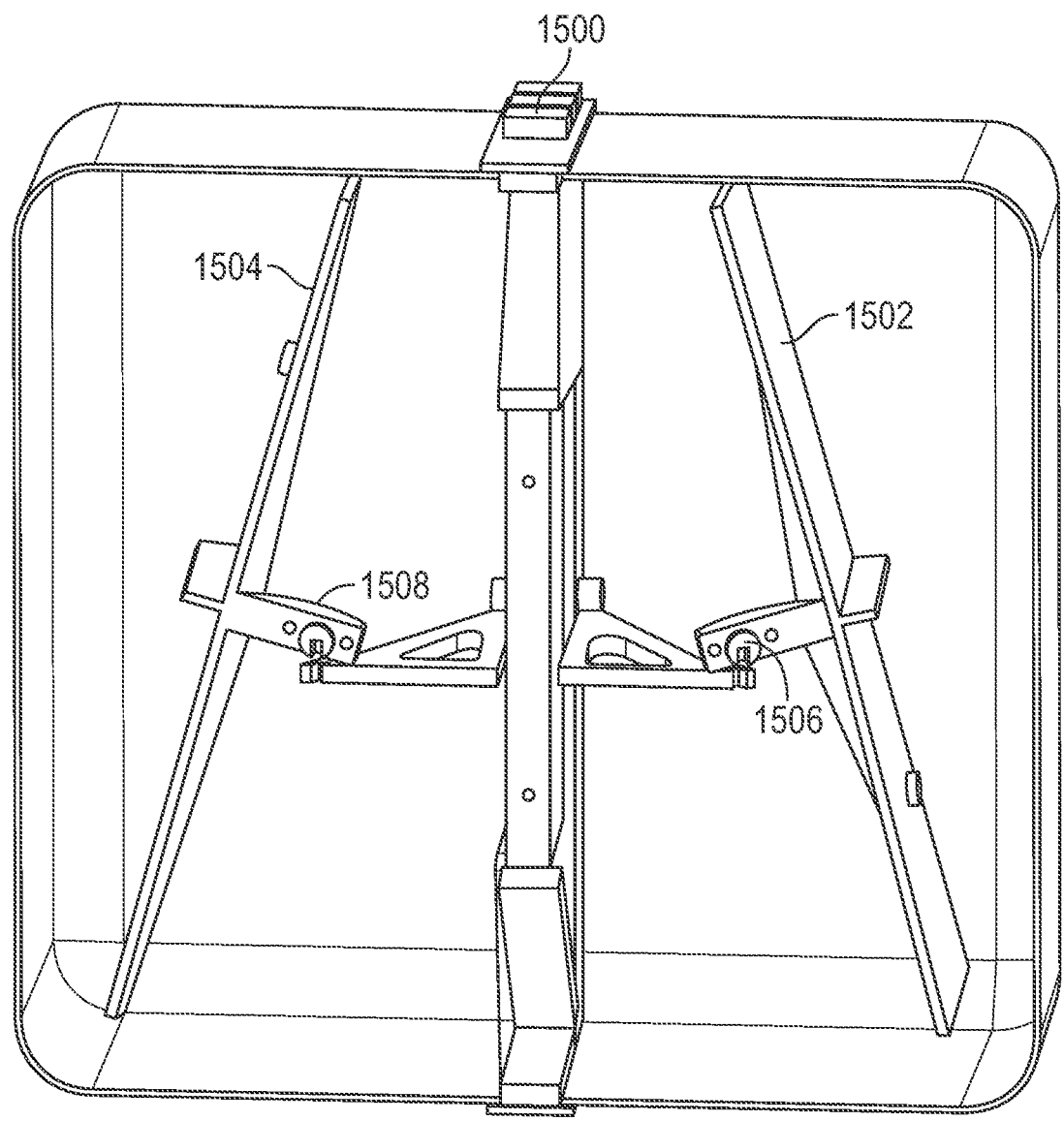
FIG. 15 illustrates a dual reflectarray on a rotating mount in accordance to various implementations of the subject technology.
Figure 16:
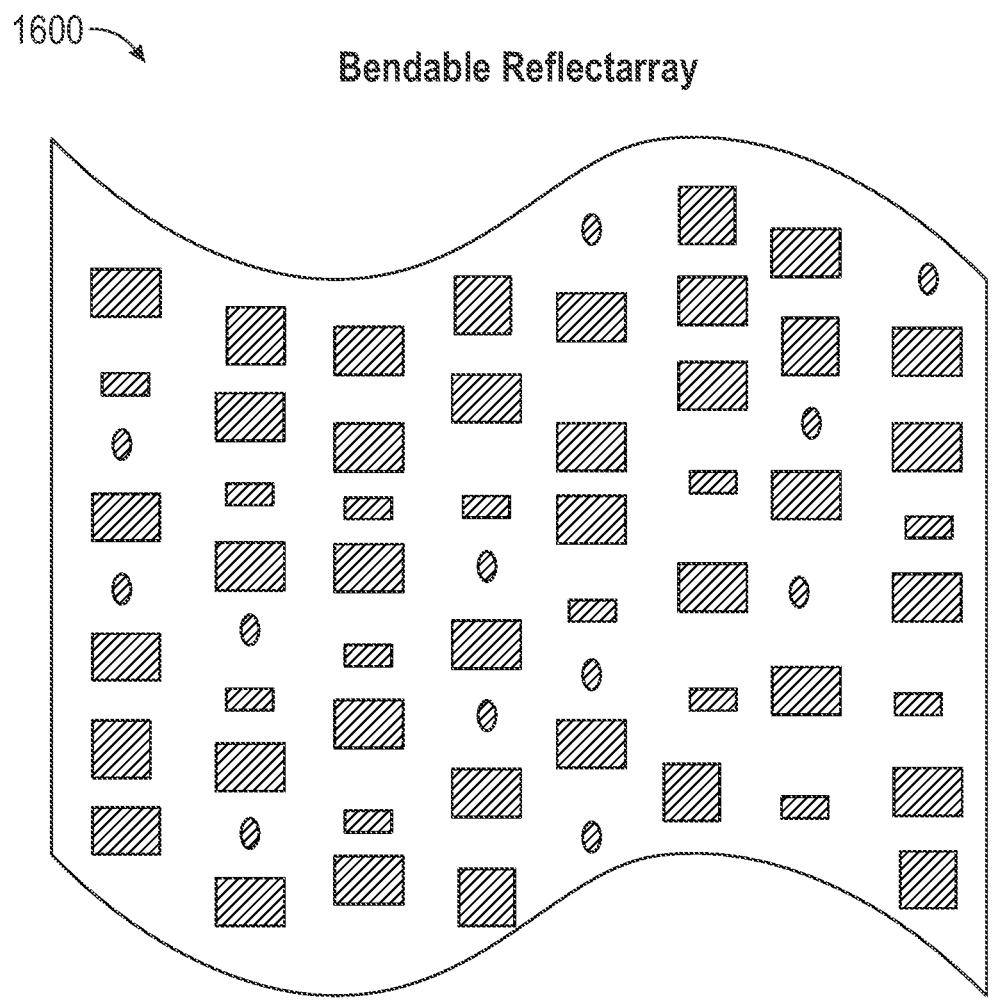
FIG. 16 illustrates a bendable reflectarray in accordance to various implementations of the subject technology.

Other configurations of rotating reflectarrays may be implemented as desired. FIG. 15 illustrates an example of a dual reflectarray on a rotating mount. Structure 1500 is designed to support two reflectarrays: reflectarray 1502 and reflectarray 1504. These reflectarrays can be rotated to different orientations by rotating levers 1506 and 1508, respectively. In one example, reflectarray 1502 has a horizontal orientation and reflectarray 1504 has a vertical orientation. Their orientations can be changed as needed by the respective 5G application. An even more flexible reflectarray in terms of its configuration and placement capabilities is illustrated in FIG. 16. Reflectarray 1600 is a bendable reflectarray that is manufactured of a bendable and flexible PCB material for many applications.

Figure 17:
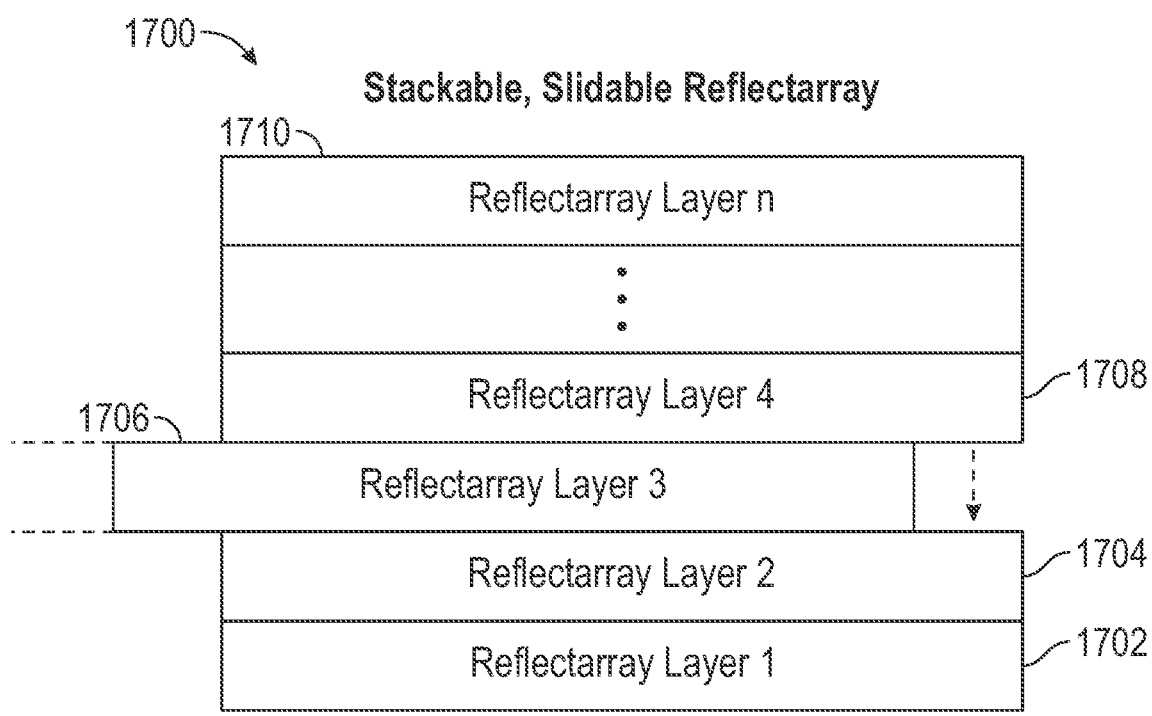
FIG. 17 is a schematic diagram of a stackable, slidable reflectarray having multiple reflectarray layers in accordance to various implementations of the subject technology.

FIG. 17 shows a stackable, slidable reflectarray in accordance to various examples. Reflectarray 1700 is a stackable structure having multiple reflectarray layers. Each reflectarray layer, e.g., reflectarray layers 1702-1710, is designed according to its placement in the stack. The stack may be changed as desired by the application, so that at any given time a network operator may remove a reflectarray layer from the stack, e.g., reflectarray layer 1706, while the other reflectarray layers stay in their place or are moved to accommodate the displacement of the reflectarray layer that was removed. Note that this design configuration of reflectarray 1700 enables many different 5G applications to take advantage of the capabilities of reflectarrays to provide high gain to specific directions. The stackable structure of reflectarray 1700 allows 5G network operators to select from a library or catalog of already manufactured reflectarrays to satisfy different design criteria. Similarly, a library or catalog of removable covers may be used with a single or stackable reflectarray. Note that the materials of the reflectarray layers 1702-1710 are selected such that RF signals are able to be reflected according to the design criteria. In various examples, a given layer may be a transparent layer able to reflect signals at a given frequency. Each reflectarray layer in the stack may be designed to reflect signals at a different frequency.

Figure 18:
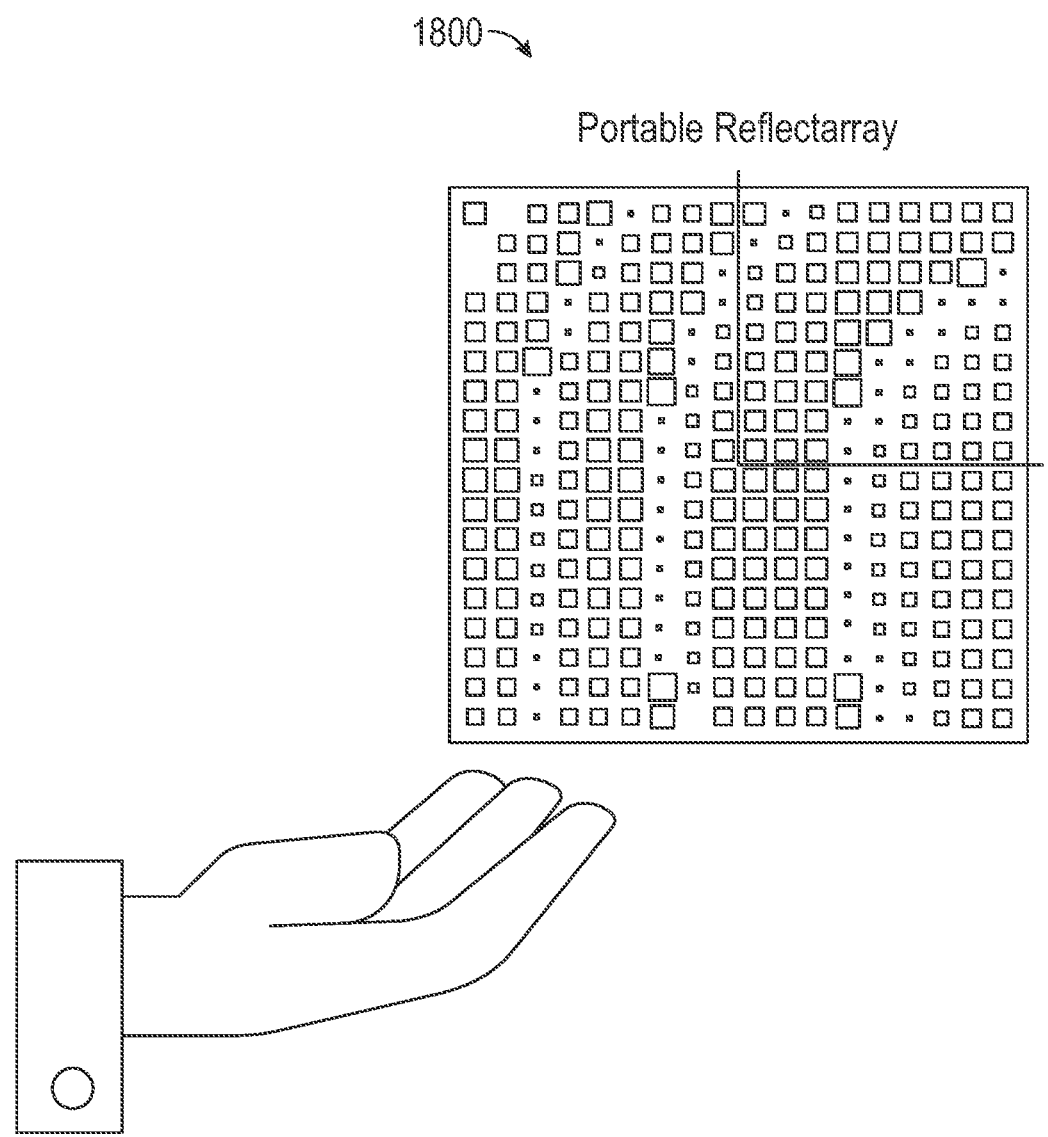
FIG. 18 illustrates a portable reflectarray in accordance to various implementations of the subject technology.

Another configuration for a reflectarray is shown in FIG. 18, which illustrates a portable reflectarray 1800 that may be easily transported within a 5G network as desired. The portable reflectarray 1800 may be selected from a library of reflectarrays to achieve a particular need within a 5G network or application. The portable reflectarray 1800 may also be a portable stackable reflectarray as shown in FIG. 17, or have a removable cover as shown in FIG. 12 that is selected from a catalog of covers. The removable cover may be used to display an ad, promotion or message within the 5G network. The portable reflectarray 1800 is easily transportable and may be mounted to a wall or other surface as needed.

Figure 19:
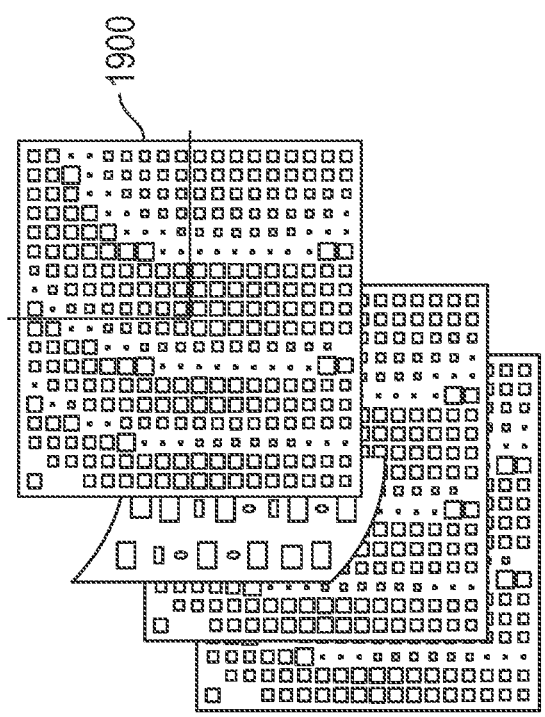
FIG. 19 illustrates a library of reflectarrays and a library of removable covers according to various implementations of the subject technology.
Figure 19:
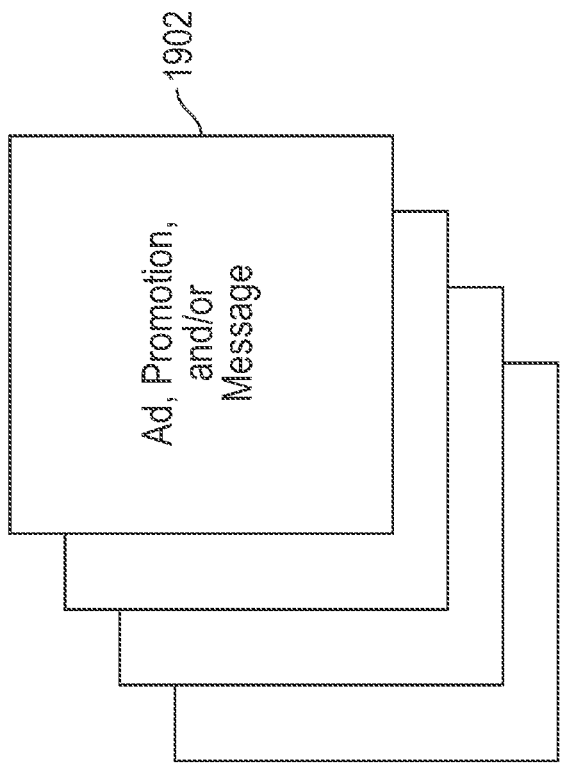

Wireless network operators can have access to a catalog of reflectarrays 1900 and covers 1902 as illustrated in FIG. 19, or they can request custom made designs of reflectarrays and covers if desired. In addition to many configurations, the reflectarrays disclosed herein are able to generate focused beams as desired, e.g., narrow in azimuth and broad in elevation, at different frequencies (e.g., single, dual, multiband or broadband), with different materials, and so forth. The reflectarrays can reach a wide range of directions and locations in any 5G environment. These reflectarrays are low cost, easy to manufacture and set up, and may be self-calibrated without requiring a 5G operator to adjust their operation. They may be passive or active and achieve MIMO like gains and enrich the multipath environment. It is appreciated that these reflectarrays effectively enable the desired performance and high-speed data communications promises of 5G.

Figure 20:
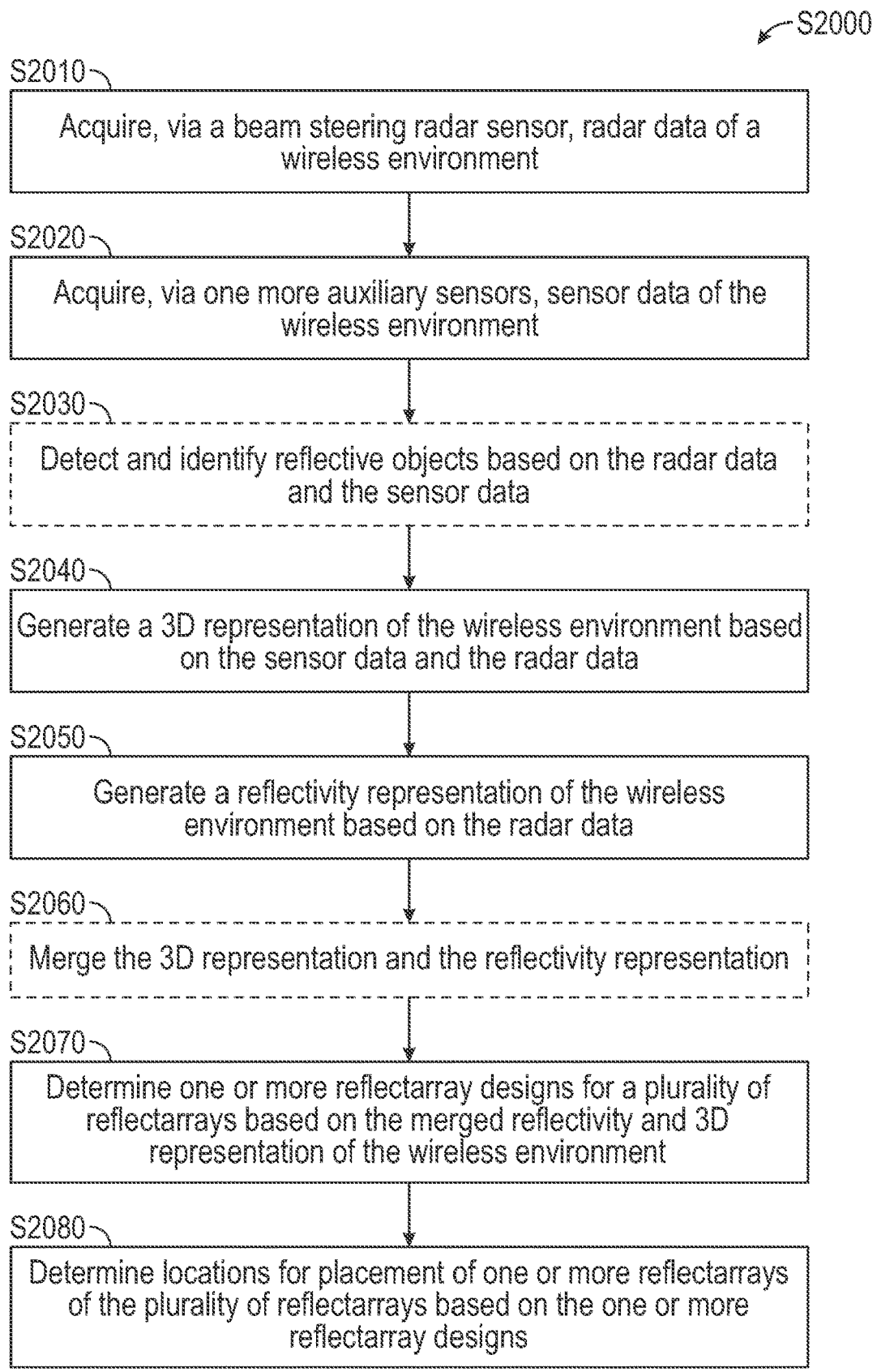
FIG. 20 illustrates a flowchart for a method for wireless network planning, in accordance with various implementations of the subject technology.

FIG. 20 illustrates a flowchart for a method S2000 for wireless network planning, in accordance with various implementations of the subject technology. This method uses a sensor fusion approach as described in various embodiments of the disclosure. For example, the method S2000 can be described herein with respect to the sensor fusion scanning system 300 of FIG. 3; however, the method S2000 is not limited to the scanning system 300 of FIG. 3, and the method S2000 can be performed by one or more other components of the sensor fusion scanning system 300 of FIG. 3, or any other components and systems as described in various embodiments of the disclosure. In accordance with various embodiments, one or more steps included in the method S2000 can occur in series, linearly, sequentially, and/or in parallel. In addition, the various steps included in the method S2000 can be performed in a different order than the order shown and/or one or more of the various steps included in the method S2000 may not be performed.

As illustrated in FIG. 20, the method S2000 includes acquiring, via a beam steering radar sensor, such as the beam steering radar 500, radar data of a wireless environment, at step S2010. The method S2000 includes acquiring, via one or more auxiliary sensors, sensor data of the wireless environment, at step S2020. In various embodiments, the one or more auxiliary sensors include a lidar and a camera. As described in various embodiments, the lidar and the camera, along with the beam steering radar sensor (also referred as beam steering radar) are part of the sensor scanning mobile platform 302. In various embodiments, sensor data from the lidar and/or camera and radar data from the beam steering radar sensor are used to scan the wireless environment (e.g., wireless communication environment), such as for example, conference room, a concert stadium, a sports arena, a college or university campus, etc. In various embodiments, the various data is acquired while the sensor scanning mobile platform moves within the environment while acquiring data on objects (e.g., walls, signs, moving vehicles, pedestrians, etc.) in the scene with its sensor.

In various embodiments, the method S2000 optionally includes, at step S2030, detecting and identifying reflective objects based on the radar data and the sensor data. The method S2000 includes, at step S2040, generating a 3D representation of the wireless environment based on the sensor data and the radar data. In this step, the acquired data from the lidar, the camera and the beam steering radar (radar sensor) is input into the sensor fusion processing engine, such as engine 304, to generate a 3D representation of the scanned environment. Further, at step S2050, the method S2000 includes generating a reflectivity representation of the wireless environment based on the radar data. In this step, the reflectivity representation of the objects in the wireless environment is generated by the reflectivity engine, such as engine 306. In various embodiments, the method S2000 optionally includes merging the 3D representation and the reflectivity representation, at step S2060. At this step, the 3D and reflectivity representations can be combined or merged in the reflectarray planning engine, such as engine 308.

Further illustrated in FIG. 20, at step S2070, the method S2000 includes determining one or more reflectarray designs for a plurality of reflectarrays based on the merged reflectivity and 3D representation of the wireless environment. This step is used to determine one or more reflectarray designs for one or more reflectarrays. The method S2000 further includes, at step S2080, determining locations for placement of one or more reflectarrays of the plurality of reflectarrays based on the one or more reflectarray designs. This step is used to determine placements for the one or more reflectarrays. In accordance with various embodiments, the reflectarrays are designed and placed in strategic locations in the wireless environment to increase the performance of the wireless network, boosting the wireless signals and providing coverage to UE in both LOS and NLOS areas, near and far away from each of the reflectarrays. In various embodiments, the beam steering radar sensor and the one or more auxiliary sensors, such as the lidar and camera, are mounted on a sensor scanning mobile platform that is configured to autonomously scan the wireless environment to provide continuous real-time information on distances to reflective objects in the wireless environment.

In accordance with various embodiments, a sensor fusion scanning system is disclosed. The sensor fusion scanning system includes a sensor scanning mobile platform having a beam steering radar sensor and one or more auxiliary sensors. The sensor scanning mobile platform is configured to scan a scene, or a wireless environment as disclosed herein. The sensor fusion scanning system also includes a reflectivity engine configured to generate a reflectivity representation of the wireless environment based on radar data from the beam steering radar sensor, a sensor fusion processing engine configured to generate a Three-Dimensional ("3D") representation of the wireless environment based on the radar data and sensor data from the one or more auxiliary sensors, and a reflectarray planning engine configured to design a plurality of reflectarrays and determine locations for the plurality of reflectarrays in the wireless environment based on the reflectivity representation and the 3D representation.

In accordance with various embodiments, the beam steering radar sensor includes a transmit antenna and a receive antenna each having a metastructure capable of radiating radio frequency (RF) signals in millimeter wave frequencies. In various embodiments, the plurality of reflectarrays comprise a focused metastructure based reflectarray, a portable stackable reflectarray, or a stackable structure having multiple reflectarray layers. In various embodiments, the one or more auxiliary sensors include a lidar and wherein the sensor data comprise individual point positions of surfaces and objects in the wireless environment measured by the lidar. In various embodiments, the wireless environment comprises Line-of-Sight ("LOS") areas and Non-Line-of-Sight ("NLOS") areas.

In various embodiments, generating the reflectivity representation of the wireless environment by the reflectivity engine includes computing reflectivity of surfaces and objects in the wireless environment based on reflected radio frequency (RF) signals in the radar data generated by the beam steering radar sensor. In various embodiments, the sensor fusion processing engine includes one or more neural networks configured to detect and identify one or more reflective objects in the wireless environment. In various embodiments, the sensor scanning mobile platform is deployed autonomously with autopilot instructions to iteratively scan the wireless environment and provide continuous real-time information on distances to reflective objects in the wireless environment.

In accordance with various embodiments, a system for wireless network planning is disclosed. The system includes a mobile scanning platform configured to scan a wireless environment, the platform comprising a beam steering radar, a lidar, and a camera. The system also includes a reflectivity engine configured to generate a reflectivity representation of the wireless environment based on radar data from the beam steering radar, a processing engine configured to generate a Three-Dimensional ("3D") representation of the wireless environment based on the radar data and sensor data from the lidar and the camera, and a planning engine configured to design a plurality of reflectarrays based on the reflectivity representation and the 3D representation.

In various embodiments, the planning engine is further configured to determine locations for the plurality of reflectarrays in the wireless environment based on the design of one or more of the reflectarrays. In various embodiments, the beam steering radar includes a transmit antenna and a receive antenna each having a metastructure capable of radiating radio frequency (RF) signals in millimeter wave frequencies. In various embodiments, the plurality of reflectarrays include a focused metastructure based reflectarray, a portable stackable reflectarray, or a stackable structure having multiple reflectarray layers. In various embodiments, generating the reflectivity representation of the wireless environment by the reflectivity engine includes computing reflectivity of surfaces and objects in the wireless environment based on reflected radio frequency (RF) signals in the radar data. In various embodiments, the processing engine includes or utilizes one or more neural networks configured to detect and identify one or more reflective objects in the wireless environment. In various embodiments, the mobile planning platform is configured to autonomously scan the wireless environment ands provide continuous real-time information on distances to reflective objects in the wireless environment.

In accordance with various embodiments, a method for wireless network planning is disclosed. The method includes acquiring, via a beam steering radar sensor, radar data of a wireless environment, acquiring, via one or more auxiliary sensors, sensor data of the wireless environment, generating a 3D representation of the wireless environment based on the sensor data and the radar data, generating a reflectivity representation of the wireless environment based on the radar data, determining one or more reflectarray designs for a plurality of reflectarrays based on the merged reflectivity and 3D representation of the wireless environment, and determining locations for placement of one or more reflectarrays of the plurality of reflectarrays based on the one or more reflectarray designs.

In various embodiments, prior to generating the 3D representation and the reflectivity representation, the method further includes detecting and identifying reflective objects based on the radar data and the sensor data. In various embodiments, the detecting and the identifying of the reflective objects are performed using one or more neural networks.

In various embodiments, prior to determining the one or more reflectarray designs or the locations, the method further includes merging the 3D representation and the reflectivity representation. In various embodiments, the beam steering radar sensor and the one or more auxiliary sensors are mounted on a scanning mobile platform that is configured to autonomously scan the wireless environment to provide continuous real-time information on distances to reflective objects in the wireless environment.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A sensor fusion scanning system, comprising:
    a sensor scanning mobile platform comprising a beam steering radar sensor and one or more auxiliary sensors, the sensor scanning mobile platform configured to scan a wireless environment;
    a reflectivity engine configured to generate a reflectivity representation of the wireless environment based on radar data from the beam steering radar sensor;
    a sensor fusion processing engine configured to generate a Three-Dimensional ("3D") representation of the wireless environment based on the radar data and sensor data from the one or more auxiliary sensors; and
    a reflectarray planning engine configured to determine locations for placement of a plurality of reflectarrays in the wireless environment based on the reflectivity representation and the 3D representation, the reflectarrays incorporate analog beam steering and digital signal processing to generate directed beams.

2. The system of claim 1, wherein the beam steering radar sensor comprises a transmit antenna and a receive antenna each having a metastructure capable of radiating radio frequency (RF) signals in millimeter wave frequencies.

3. The system of claim 1, wherein the plurality of reflectarrays comprise a focused metastructure based reflectarray, a portable stackable reflectarray, or a stackable structure having multiple reflectarray layers.

4. The system of claim 1, wherein the one or more auxiliary sensors comprise a lidar and wherein the sensor data comprise individual point positions of surfaces and objects in the wireless environment measured by the lidar.

5. The system of claim 1, wherein the wireless environment comprises Line-of-Sight ("LOS") areas and Non-Line-of-Sight ("NLOS") areas.

6. The system of claim 1, wherein the reflectivity engine is further configured to generate the reflectivity representation of the wireless environment by computing reflectivity of surfaces and objects in the wireless environment based on reflected radio frequency (RF) signals in the radar data generated by the beam steering radar sensor.

7. The system of claim 1, wherein the sensor fusion processing engine comprises one or more neural networks configured to detect and identify one or more reflective objects in the wireless environment.

8. The system of claim 1, wherein the sensor scanning mobile platform is deployed autonomously with autopilot instructions to iteratively scan the wireless environment and provide continuous real-time information on distances to reflective objects in the wireless environment.

9. The system of claim 1, wherein the mobile planning platform is configured to autonomously scan the wireless environment to provide continuous real-time information on distances to reflective objects in the wireless environment.

10. The system of claim 1, further comprising:
    at least one phase shifter for analog beam steering;
    an analog controller to generate an analog control signal to apply to a phase shifter; and
    a DSP engine to convert analog signals to digital signals to determine angles of arrival of received signals.

11. A system for wireless network planning, comprising:
a mobile scanning platform configured to scan a wireless environment, the platform comprising a beam steering radar, a lidar, and a camera;
a reflectivity engine configured to generate a reflectivity representation of the wireless environment based on radar data from the beam steering radar;
a processing engine configured to generate a Three-Dimensional ("3D") representation of the wireless environment based on the radar data and sensor data from the lidar and the camera; and
a planning engine configured to determine locations for placement of a plurality of reflectarrays in the wireless environment based on the reflectivity representation and the 3D representation, wherein the reflectarrays incorporate analog beam steering and digital signal processing to generate directed beams.

12. The system of claim 11, wherein the planning engine is further configured to determine locations for the plurality of reflectarrays in the wireless environment based on the design of one or more of the reflectarrays.

13. The system of claim 11, wherein the beam steering radar comprises a transmit antenna and a receive antenna each having a metastructure capable of radiating radio frequency (RF) signals in millimeter wave frequencies.

14. The system of claim 11, wherein the plurality of reflectarrays comprise a focused metastructure based reflectarray, a portable stackable reflectarray, or a stackable structure having multiple reflectarray layers.

15. The system of claim 11, wherein the reflectivity engine is further configured to generate the reflectivity representation of the wireless environment by computing reflectivity of surfaces and objects in the wireless environment based on reflected radio frequency (RF) signals in the radar data.

16. The system of claim 11, wherein the processing engine comprises one or more neural networks configured to detect and identify one or more reflective objects in the wireless environment.

17. A method for wireless network planning, comprising:
acquiring, via a beam steering radar sensor, radar data of a wireless environment;
acquiring, via one or more auxiliary sensors, sensor data of the wireless environment;
generating a 3D representation of the wireless environment based on the sensor data and the radar data;
generating a reflectivity representation of the wireless environment based on the radar data;
merging the reflectivity representation and the 3D representation of the wireless environment;
determining one or more reflectarray designs for a plurality of reflectarrays based on the merged reflectivity and 3D representation of the wireless environment, the reflectarrays incorporate analog beam steering and digital signal processing to generate directed beams; and
determining locations for placement of the plurality of reflectarrays in the wireless environment based on the one or more reflectarray designs.

18. The method of claim 17, further comprising:
prior to generating the 3D representation and the reflectivity representation, detecting and identifying reflective objects based on the radar data and the sensor data.

19. The method of claim 18, wherein the detecting and the identifying of the reflective objects are performed using one or more neural networks.

20. The method of claim 17, wherein the beam steering radar sensor and the one or more auxiliary sensors are mounted on a scanning mobile platform that is configured to autonomously scan the wireless environment and provide continuous real-time information on distances to reflective objects in the wireless environment.

* * * * *